United States Patent
Lee et al.

(10) Patent No.: US 12,326,817 B2
(45) Date of Patent: Jun. 10, 2025

(54) STORAGE DEVICE FOR MANAGING MAP DATA, COMPUTING DEVICE INCLUDING STORAGE DEVICE FOR MANAGING MAP DATA AND MEMORY DEVICE, AND OPERATING METHOD OF COMPUTING DEVICE

(71) Applicant: SAMSUNG ELECTRONICS CO., LTD., Suwon-si (KR)

(72) Inventors: Kyunghan Lee, Suwon-si (KR); Jae-Gon Lee, Suwon-si (KR); Chon Yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 18/136,034

(22) Filed: Apr. 18, 2023

(65) Prior Publication Data
US 2023/0359567 A1    Nov. 9, 2023

(30) Foreign Application Priority Data
May 9, 2022   (KR) .................. 10-2022-0056618

(51) Int. Cl.
*G06F 12/1009*    (2016.01)

(52) U.S. Cl.
CPC .............................. *G06F 12/1009* (2013.01)

(58) Field of Classification Search
None
See application file for complete search history.

(56) References Cited

U.S. PATENT DOCUMENTS

| | | | |
|---|---|---|---|
| 10,846,020 B2 | 11/2020 | Kotzur et al. | |
| 11,074,208 B1 | 7/2021 | Dastidar et al. | |
| 11,237,973 B2 * | 2/2022 | Kang | G06F 11/3058 |
| 11,604,735 B1 * | 3/2023 | Segev | G06F 12/0857 |
| 2018/0136875 A1 | 5/2018 | Nimmagadda et al. | |
| 2019/0004944 A1 * | 1/2019 | Widder | G06F 12/0246 |
| 2020/0042460 A1 * | 2/2020 | Oh | G06F 12/0246 |
| 2020/0065290 A1 | 2/2020 | Natu | |
| 2020/0117397 A1 | 4/2020 | Li et al. | |

(Continued)

FOREIGN PATENT DOCUMENTS

KR   10-2018-0054394 A    5/2018

*Primary Examiner* — Edward J Dudek, Jr.
*Assistant Examiner* — Ralph A Verderamo, III
(74) *Attorney, Agent, or Firm* — Sughrue Mion, PLLC

(57) ABSTRACT

A computing device includes a storage device and a memory. The storage device includes nonvolatile and internal buffer memories, and a storage controller that controls the nonvolatile and internal buffer memories and communicates with a bus. The memory includes a buffer memory and a memory controller that controls the buffer memory and communicates with the bus. The nonvolatile memory stores user data and map data. In an initialization operation, the storage controller sends the map data to the memory through the bus, and the memory controller stores the map data that is transferred from the storage device through the bus, in the buffer memory. After the initialization operation, the memory controller sends partial map data of the map data to the storage device through the bus, and the storage controller stores the partial map data that is transferred from the memory through the bus, in the internal buffer memory.

20 Claims, 19 Drawing Sheets

(56) References Cited

U.S. PATENT DOCUMENTS

| | | | |
|---|---|---|---|
| 2020/0226072 A1* | 7/2020 | Kang | G06F 12/10 |
| 2020/0233796 A1* | 7/2020 | Kim | G06F 12/123 |
| 2020/0334166 A1* | 10/2020 | Byun | G06F 12/10 |
| 2020/0401331 A1 | 12/2020 | Mulani et al. | |
| 2021/0096778 A1* | 4/2021 | Nagarajan | G06F 3/0656 |
| 2021/0149803 A1 | 5/2021 | Bernat | |
| 2021/0232339 A1 | 7/2021 | Mehra | |
| 2022/0050606 A1* | 2/2022 | Chen | G06F 3/061 |
| 2023/0153028 A1* | 5/2023 | Hahn | G06F 3/0604 |
| | | | 711/154 |
| 2023/0153235 A1* | 5/2023 | Muthiah | G06F 12/0246 |
| | | | 711/154 |

* cited by examiner

STORAGE DEVICE FOR MANAGING MAP DATA, COMPUTING DEVICE INCLUDING STORAGE DEVICE FOR MANAGING MAP DATA AND MEMORY DEVICE, AND OPERATING METHOD OF COMPUTING DEVICE

CROSS-REFERENCE TO RELATED APPLICATIONS

This application is based on and claims priority under 35 U.S.C. § 119 to Korean Patent Application No. 10-2022-0056618 filed on May 9, 2022, in the Korean Intellectual Property Office, the disclosure of which being incorporated by reference herein in its entirety.

BACKGROUND

Embodiments of the present disclosure described herein relate to an electronic device, and more particularly, relate to a storage device managing map data, a computing device including the storage device and a memory device, and an operating method of the computing device.

A storage device such as a solid state drive may include a NAND flash memory. A system of logical block addresses used in a host is different from a system of physical block addresses of the NAND flash memory of the storage device. For this reason, the storage device may perform translation between a logical block address of the host and a physical block address of the NAND flash memory by using map data in which the logical block address and the physical block address are mapped.

As the capacity of the NAND flash memory increases, the capacity of the map data may also increase. As such, there may be required a high-capacity buffer memory to be used in the storage device, thereby causing costs for new research and development.

SUMMARY

It is an aspect to provide a storage device managing a large amount of map data without a high-capacity dedicated buffer memory for use in the storage device, a computing device including a storage device and a memory device, and an operating method of the computing device.

According to an aspect of one or more embodiments, there is provided a computing device comprising a storage device including a nonvolatile memory, an internal buffer memory, and a storage controller configured to control the nonvolatile memory and the internal buffer memory and to communicate with a bus; and a memory including a buffer memory and a memory controller configured to control the buffer memory and to communicate with the bus, wherein the nonvolatile memory of the storage device stores user data and map data, wherein, in an initialization operation, the storage controller sends the map data to the memory through the bus, wherein, in the initialization operation, the memory controller stores the map data that is transferred from the storage device through the bus, in the buffer memory, wherein, after the initialization operation, the memory controller sends partial map data of the map data to the storage device through the bus, and wherein the storage controller stores the partial map data that is transferred from the memory through the bus, in the internal buffer memory.

According to another aspect of one or more embodiments, there is provided a storage device comprising a nonvolatile memory; an internal buffer memory; and a storage controller configured to control the nonvolatile memory and the internal buffer memory and to communicate with an external bus, wherein the nonvolatile memory includes user data and map data, wherein the map data includes a plurality of address pairs in which logical block addresses are mapped to physical block addresses, wherein, in an initialization operation, the storage controller outputs the map data to the external bus, and wherein, after the initialization operation, the storage controller receives partial map data of the map data from the external bus and stores the partial map data in the internal buffer memory.

According to yet another aspect of one or more embodiments, there is provided an operating method of a computing device which includes a storage device and a memory, the method comprising sending, at the storage device, map data stored in a nonvolatile memory of the storage device to the memory through a bus; reading, at the storage device, partial map data of the map data from the memory through the bus and storing the partial map data in an internal buffer memory of the storage device; and executing, at the storage device, a command that is transferred through the bus from a processor connected with the bus, based on one of the map data present in the memory and the partial map data present in the internal buffer memory.

BRIEF DESCRIPTION OF THE FIGURES

The above and other aspects will become apparent by describing in detail embodiments thereof with reference to the accompanying drawings.

DETAILED DESCRIPTION

Below, various embodiments will be described in detail and clearly to such an extent that an ordinary one in the art easily implements the present disclosure.

Figure 1:
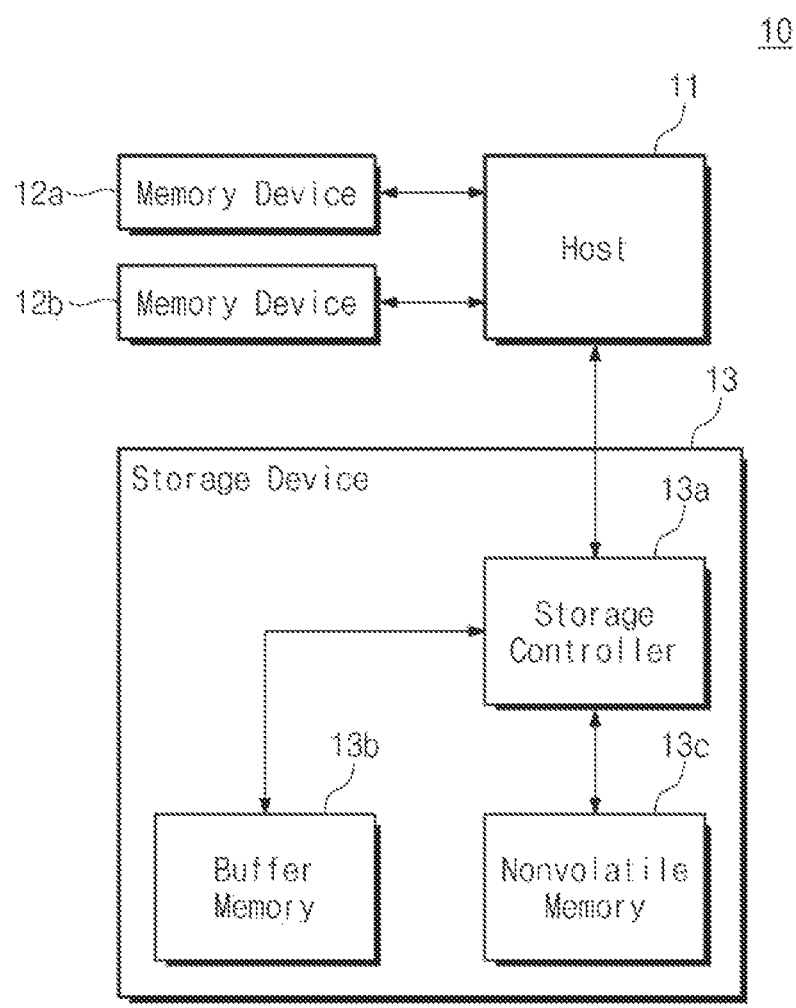
FIG. 1 is a block diagram illustrating a computing system including a storage device.

FIG. 1 is a block diagram illustrating a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information for the storage device 13 to operate. For example, the storage controller 13a may manage data stored in the nonvolatile memory 13c by using map data. The map data may include information about relationship between a logical block address managed by the host 11 and a physical block address of the nonvolatile memory 13c. The storage controller 13a may load and use the map data onto the buffer memory 13b.

The buffer memory 13b may be a high-speed memory such as a DRAM. As the capacity of the nonvolatile memory 13c increases, the size of map data may necessarily increase. However, because the capacity of the buffer memory 13b included in the single storage device 13 is limited, it is impossible to cope with the increase in the size of the map data due to the increase in the capacity of the nonvolatile memory 13c.

Figure 2:
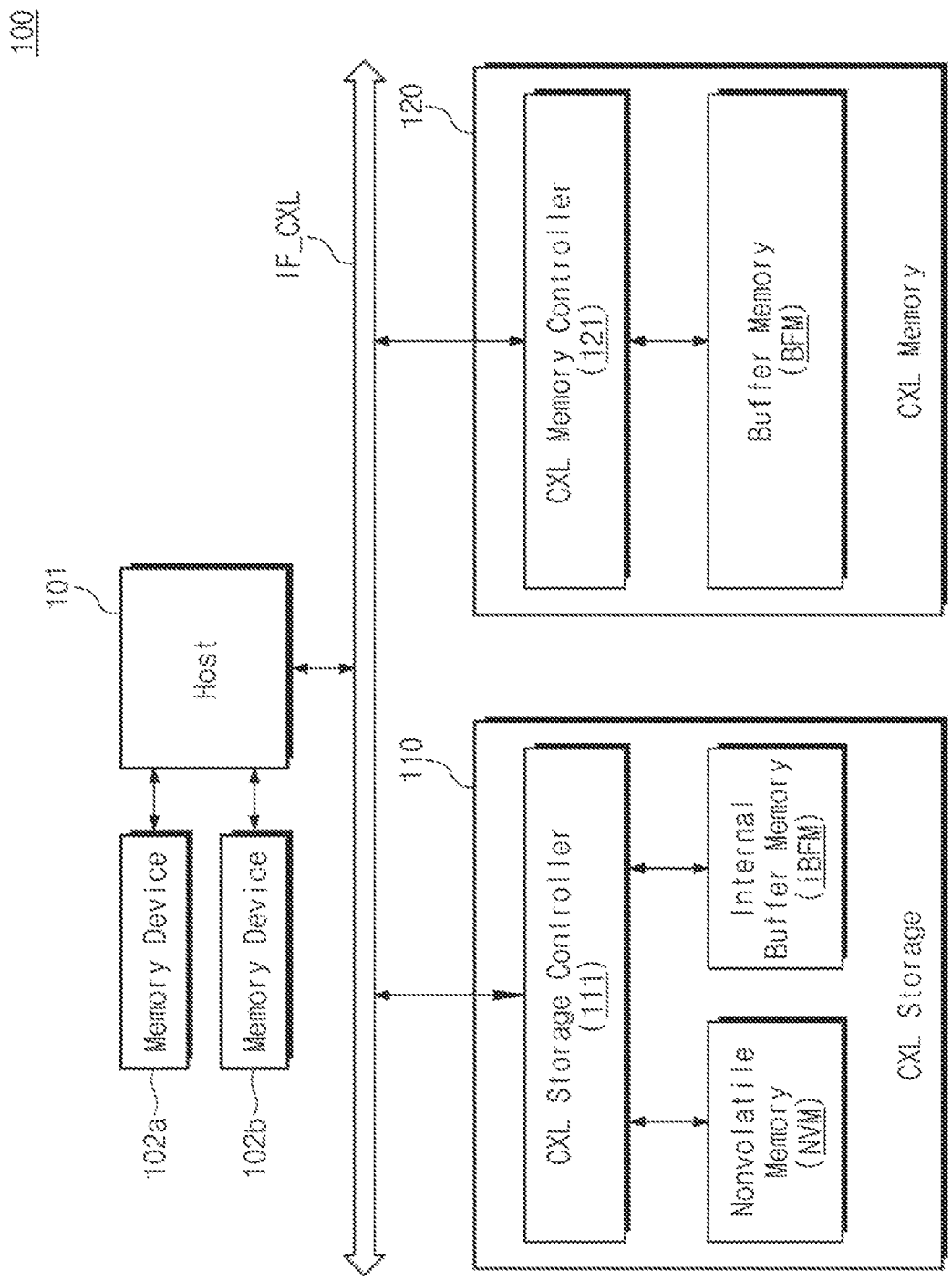
FIG. 2 is a block diagram illustrating a computing system to which a storage system according to some embodiments is applied.

FIG. 2 is a block diagram illustrating a computing system to which a storage system according to some embodiments is applied. Referring to FIG. 2, a computing system 100 may include a host 101, a plurality of memory devices 102a and 102b, Compute eXpress Link (CXL) storage 110, and a CXL memory 120. In an embodiment, the computing system 100 may be included in user devices such as a personal computer, a laptop computer, a server, a media player, and a digital camera or automotive devices such as a navigation system, a black box, and an automotive electronic device/part. In some embodiments, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102a and 102b may be used as a main memory or a system memory of the computing system 100. In an embodiment, each of the plurality of memory devices 102a and 102b may be a dynamic random access memory (DRAM) device and may have the form factor of the dual in-line memory module (DIMM). However, the present disclosure is not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may directly communicate with the host 101 through the DDR interface. In an embodiment, the host 101 may include a memory controller configured to control the plurality of memory devices 102a and 102b. However, the present disclosure is not limited thereto. For example, the plurality of memory devices 102a and 102b may communicate with the host 101 through various interfaces.

The CXL storage 110 may include a CXL storage controller 111, a nonvolatile memory NVM, and an internal buffer memory iBFM. Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but the present disclosure is not limited thereto.

The internal buffer memory iBFM may store a variety of information for the CXL storage 110 to operate. For example, the CXL storage controller 111 may manage data stored in the nonvolatile memory NVM by using the map data. The map data may include information about relationship between a logical block address managed by the host 101 and a physical block address of the nonvolatile memory 13c. The CXL storage controller 111 may load and use at least a portion of the map data onto the internal buffer memory iBFM. In an embodiment, the internal buffer memory iBFM may be a high-speed memory such as a DRAM.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an embodiment, the buffer memory BFM may be a DRAM, but the present disclosure is not limited thereto.

In an embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an embodiment, the CXL interface IF_CXL may indicate a low-latency and high-bandwidth link that supports coherency, memory access, and dynamic protocol muxing of IO protocols such that various connections between accelerators, memory devices, or various electronic devices are possible.

In an embodiment, at least a partial area of the CXL memory 120 may be used as a buffer memory of the CXL storage 110. A mapping table (e.g., map data) that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, the conventional storage device 13 stores and manages the map data by using the buffer memory 13*b* included therein. As the capacity of the storage device 13 increases, the size of the map data increases, thereby causing an increase in the capacity of the buffer memory 13*b* included in the storage device 13. However, there is a limitation on an increase in capacity due to the structure and physical characteristic of the buffer memory 13*b* included in the storage device 13; in this case, the design change or additional integration of the buffer memory 13*b* is required.

In contrast, according to some embodiments, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120.

At least a portion of the map data may be stored in the internal buffer memory iBFM of the CXL storage 110. The internal buffer memory iBFM may make the access of the CXL storage controller 111 to a portion of the map data better.

The storage controller 13*a* of the conventional storage device 13 communicates with the host 11 through the host interface such as PCIe or NVMe, and communicates with the buffer memory 13*b* through the memory interface such as a DDR interface or an LPDDR interface. That is, the storage controller 13*a* of the conventional storage device 13 communicates with the host 11 placed outside and the buffer memory 13*b* included therein, through different interfaces (i.e., heterogeneous interfaces).

In contrast, according to some embodiments, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, the present disclosure is not limited thereto. For example, the host 101, the CXL storage 110, and the CXL memory 120 may communicate with each other based on various computing interfaces complying with the following: GEN-Z protocol, NVLink protocol, CCIX protocol, and Open CAPI protocol.

Figure 3:
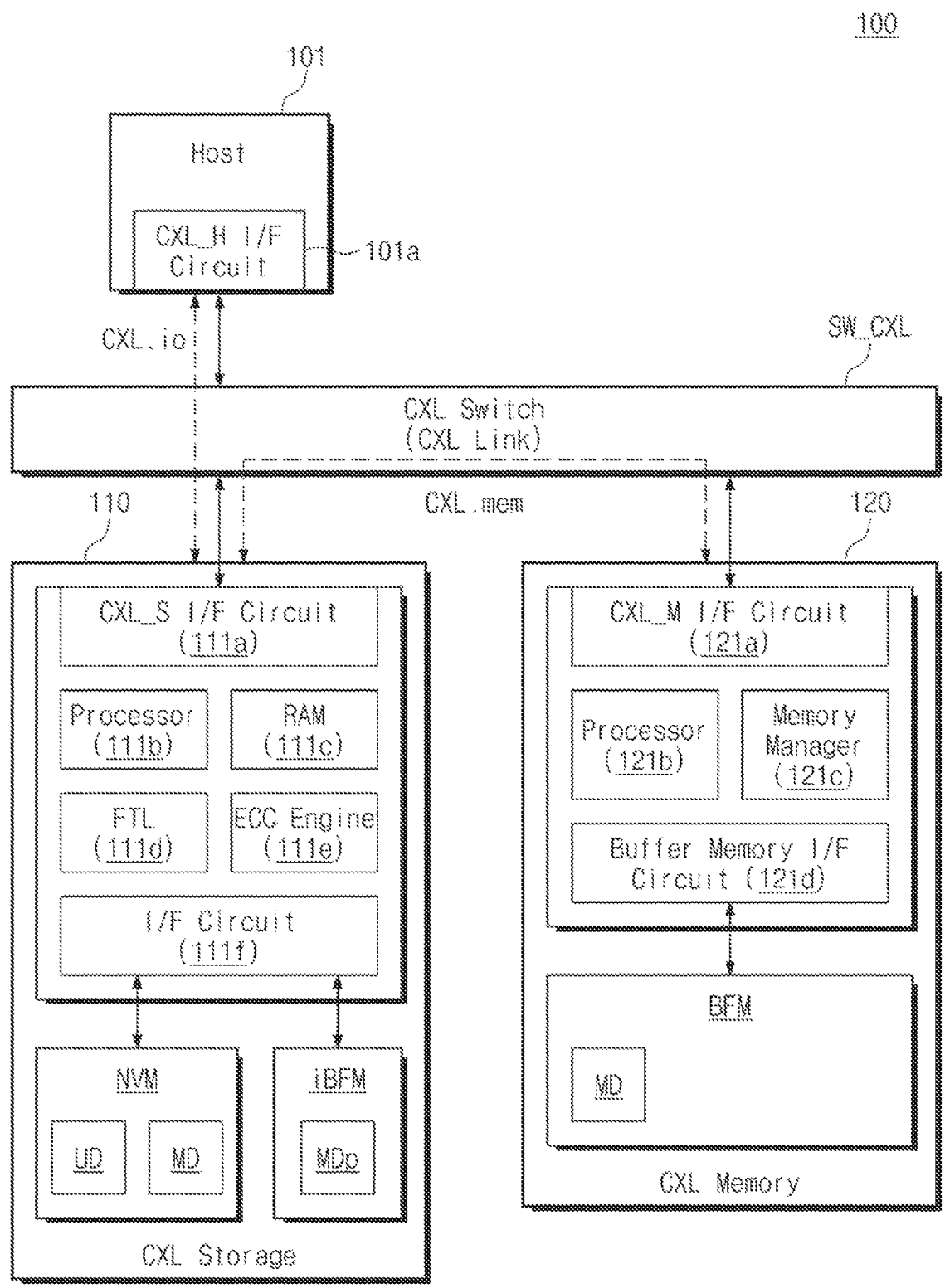
FIG. 3 is a block diagram illustrating components of a computing system of FIG. 2 in detail, according to some embodiments.

FIG. 3 is a block diagram illustrating components of a computing system of FIG. 2 in detail, according to some embodiments. Referring to FIGS. 2 and 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface (CXL_H I/F) circuit 101*a*. The CXL host interface circuit 101*a* may communicate with the CXL storage 110 or the CXL memory 120 through the CXL switch SW_CXL.

The CXL storage 110 may include the CXL storage controller 111, the nonvolatile memory NVM, and the internal buffer memory iBFM. The CXL storage controller 111 may include a CXL storage interface (CXL_S I/F) circuit 111*a*, a processor 111*b*, a RAM 111*c*, a flash translation layer (FTL) 111*d*, an error correction code (ECC) engine 111*e*, and an interface circuit 111*f*.

The CXL storage interface circuit 111*a* may be connected with the CXL switch SW_CXL. The CXL storage interface circuit 111*a* may communicate with the host 101 or the CXL memory 120 through the CXL switch SW_CXL.

The processor 111*b* may be configured to control an overall operation of the CXL storage controller 111. The RAM 111*c* may be used as a working memory or a buffer memory of the CXL storage controller 111. In an embodiment, the RAM 111*c* may be an SRAM and may be used as a read buffer and a write buffer for the CXL storage 110. In an embodiment, as will be described below, the RAM 111*c* may be configured to temporarily store a portion of map data MD or MDp read from the CXL memory 120 or the internal buffer memory iBFM.

The FTL 111*d* may perform various management operations for efficiently using the nonvolatile memory NVM. For example, the FTL 111*d* may perform address translation between a logical block address managed by the host 101 and a physical block address used in the nonvolatile memory NVM, based on the map data MD (or a mapping table). The FTL 111*d* may perform a bad block management operation for the nonvolatile memory NVM. The FTL 111*d* may perform a wear leveling operation for the nonvolatile memory NVM. The FTL 111*d* may perform a garbage collection operation for the nonvolatile memory NVM.

In an embodiment, the FTL 111*d* may be implemented in the form of hardware, firmware, or software, or in the form of a combination thereof. In the case where the FTL 111*d* is implemented in the form of firmware or software, program codes associated with the FTL 111*d* may be stored in the RAM 111*c* and may be driven by the processor 111*b*. In the case where the FTL 111*d* is implemented by hardware, hardware components configured to perform the above management operations may be implemented in the CXL storage controller 111.

The ECC engine 111*e* may perform error detection and correction on data read from the nonvolatile memory NVM. For example, the ECC engine 111*e* may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The interface circuit 111f may include a NAND interface circuit that controls the nonvolatile memory NVM such that data are stored in the nonvolatile memory NVM or data are read from the nonvolatile memory NVM, and an internal buffer memory interface circuit that controls the internal buffer memory iBFM such that data are stored in the internal buffer memory iBFM or data are read from the internal buffer memory iBFM.

In an embodiment, the NAND interface circuit may be implemented to comply with the standard protocol such as a toggle interface or ONFI. For example, the nonvolatile memory NVM may include a plurality of NAND flash devices; in the case where the NAND interface circuit is implemented based on the toggle interface, the NAND interface circuit communicates with the plurality of NAND flash devices through a plurality of channels. The plurality of NAND flash devices may be connected with the plurality of channels through a multi-channel, multi-way structure.

The NAND interface circuit may send a chip enable signal /CE, a command latch enable signal CLE, an address latch enable signal ALE, a read enable signal /RE and a write enable signal /WE to the plurality of NAND flash devices through the plurality of channels. The NAND interface circuit and the plurality of NAND flash devices may exchange a data signal DQ and a data strobe signal DQS through each channel.

TABLE 1

| /CE | CLE | ALE | /WE | /RE | DQS | DQx | MODE |
|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA" ("DATA_in"/"DATA_out"), the chip enable signal /CE maintains a low level "L". During a command input mode, the NAND interface circuit may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit may send the data "DATA" ("DATA_in") to the NAND flash device through the data signals DQx in synchronization with the rising edge ↑ and the falling edge ↓ of the data strobe signal DQS. The NAND flash device may identify the data "DATA" ("DATA_in") from the data signals DQx in response to the rising edge ↑ and the falling edge ↓ of the data strobe signal DQS.

During a data output mode, the NAND interface circuit may control signal lines such that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" ("DATA_out") to the NAND interface circuit through the data signals DQx in synchronization with the rising edge ↑ and the falling edge ↓ of the data strobe signal DQS. The NAND interface circuit may identify the data "DATA" ("DATA_out") from the data signals DQx in response to the rising edge ↑ and the falling edge ↓ of the data strobe signal DQS.

The toggle interface described above is an example, and the present disclosure is not limited thereto.

In an embodiment, the internal buffer memory interface circuit may be implemented to comply with the standardized protocol of the double data rate (DDR) synchronous dynamic random access memory (SDRAM).

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The internal buffer memory iBFM may store or output partial map data MDp under control of the CXL storage controller 111. In an embodiment, the partial map data MDp stored in the internal buffer memory iBFM may be a portion of the map data MD.

The CXL memory 120 may include the CXL memory controller 121 and the buffer memory BFM. The CXL memory controller 121 may include a CXL memory interface (CXL_M I/F) circuit 121a, a processor 121b, a memory manager 121c, and a buffer memory interface circuit 121d.

The CXL memory interface circuit 121a may be connected with the CXL switch SW_CXL. The CXL memory interface circuit 121a may communicate with the host 101 or the CXL storage 110 through the CXL switch SW_CXL.

The processor 121b may be configured to control an overall operation of the CXL memory controller 121. The memory manager 121c may be configured to manage the buffer memory BFM. For example, the memory manager 121c may be configured to translate a memory address (e.g., a logical address or a virtual address) from the host 101 or the CXL storage 110 into a physical address for the buffer memory BFM. In an embodiment, the memory address that is an address for managing a storage area of the CXL memory 120 may be a logical address or a virtual address that is designated and managed by the host 101.

The buffer memory interface circuit 121d may control the buffer memory BFM such that data are stored in the buffer memory BFM or data are read from the buffer memory BFM. In an embodiment, the buffer memory interface circuit 121d may be implemented to comply with the standard protocol such as a DDR interface or an LPDDR interface.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

In an embodiment, at least a partial area of the buffer memory BFM of the CXL memory 120 may be allocated for a dedicated area for the CXL storage 110, and the remaining area may be used as an area that is capable of being accessed by the host 101.

In an embodiment, the host 101 and the CXL storage 110 may communicate with each other by using CXL.io being an input/output protocol. The CXL.io may have a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using CXL.mem being a memory access protocol. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem being a memory access protocol. The host 101 may access, as a system memory, the remaining area (e.g., the remaining area other than the area where the map data MD are stored or the remaining area other than the CXL storage-dedicated area) of the CXL memory 120 by using the CXL.mem.

The above access types including CXL.io and CXL.mem are provided as an example, and the present disclosure is not limited thereto.

In an embodiment, the CXL storage 110 and the CXL memory 120 may be installed in a CXL interface-based physical port (e.g., a PCIe physical port). In an embodiment, the CXL storage 110 and the CXL memory 120 may be implemented based on the E1.S, E1.L, E3.S, E3.L, or PCIe AIC (CEM) form factor. In some embodiments, the CXL storage 110 and the CXL memory 120 may be implemented based on the U.2 form factor, the M.2 form factor, various different types of PCIe-based form factors, or various different types of small form factors. As will be described with reference to FIG. 14, the CXL storage 110 and the CXL memory 120 may be implemented with various types of form factors, and may support a function of a hot-plug capable of being installed in or removed from the physical port.

Figure 4:
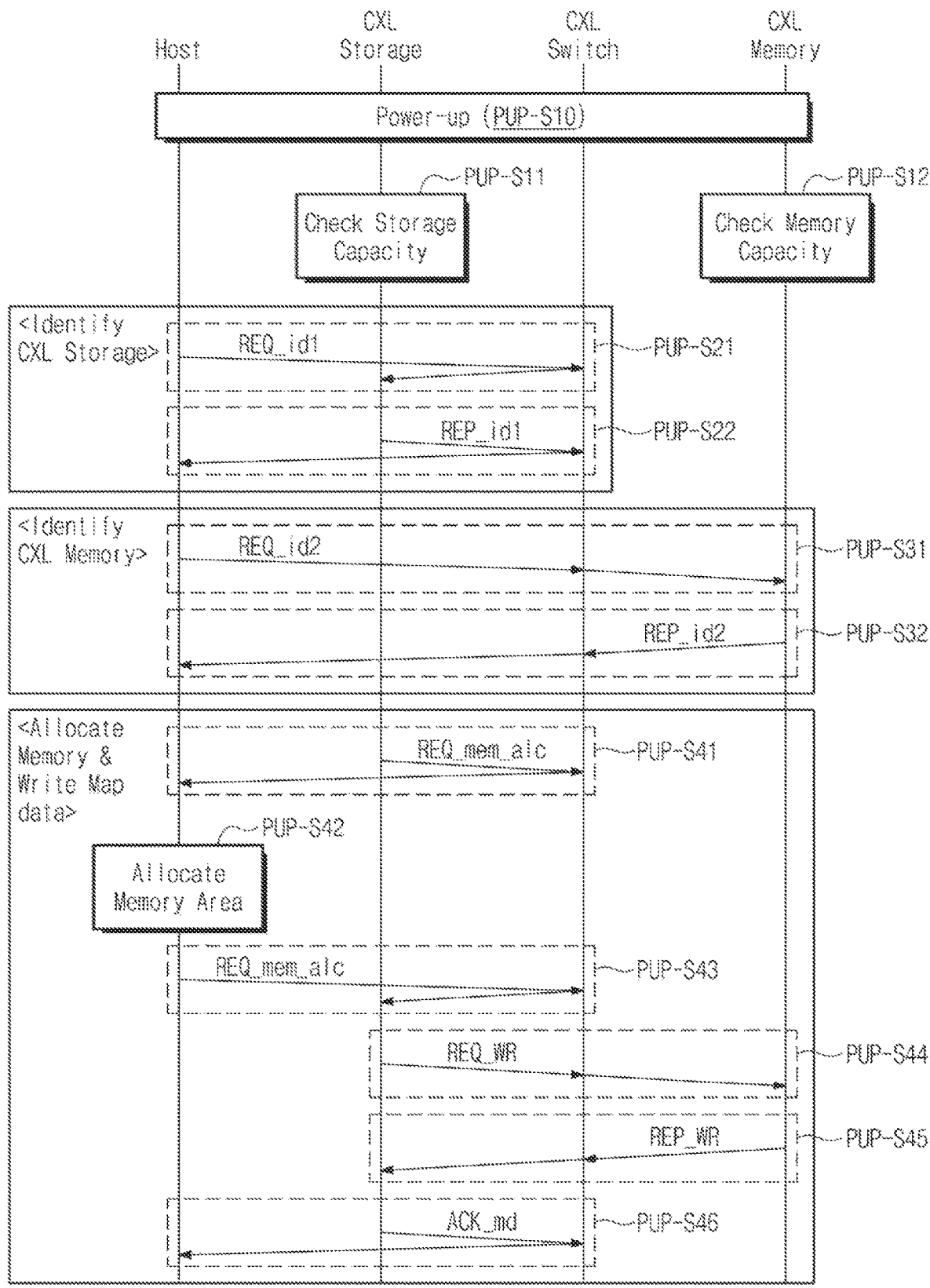
FIG. 4 is a flowchart illustrating an initialization operation or a power-up operation of a computing system of FIG. 3, according to some embodiments.

FIG. 4 is a flowchart illustrating an initialization operation or a power-up operation of a computing system of FIG. 3, according to some embodiments. Referring to FIGS. 3 and 4, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the information about power-up or initialization start, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the power-up or initialization start information. In some embodiments, operation PUP-S11 and PUP-S12 may be performed in parallel.

The host 101 may recognize information of the CXL storage 110 through operation PUP-S21 and operation PUP-S22. For example, in operation PUP-S21, the host 101 may issue a first device information request REQ_id1 for recognizing device information of the CXL storage 110 through the CXL host interface circuit 101a. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-S22, the CXL storage 110 may output a first device information response REP_id1 through the CXL storage interface circuit 111a in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an embodiment, the first device information response REP_id1 may include information about a device type and a storage capacity of the CXL storage 110.

The host 101 may recognize information of the CXL memory 120 through operation PUP-S31 and operation PUP-S32. For example, in operation PUP-S31, the host 101 may issue a second device information request REQ_id2 for recognizing device information of the CXL memory 120 through the CXL host interface circuit 101a. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121a in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an embodiment, the second device information response REP_id2 may include information about a device type and a storage capacity of the CXL memory 120.

As described above, the host 101 may identify the information about the device types (e.g., a storage type or a memory type) and capacities of the CXL storage 110 and the CXL memory 120 through operation PUP-S21 to operation PUP-S32.

The host 101 may allocate at least a partial area of the CXL memory 120 for an area dedicated for the CXL storage 110 through operation PUP-S41 to operation PUP-S46. For example, in operation PUP-S41, the CXL storage 110 may output a memory allocation request REQ_mem_alc through the CXL storage interface circuit 111a. The memory allocation request REQ_mem_alc may be transferred to the CXL switch SW_CXL. The CXL switch SW_CXL may transfer the memory allocation request REQ_mem_alc to the host 101. In an embodiment, the memory allocation request REQ_mem_alc may refer to an allocation request for an area, which is to be used as a dedicated area of the CXL storage 110, from among areas of the CXL memory 120.

In operation PUP-S42, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S43, the host 101 may output a memory allocation response REP_mem_alc through the CXL host interface circuit 101a. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL storage 110.

The CXL storage 110 may identify the area of the CXL memory 120, which is dedicated for the CXL storage 110, based on the memory allocation response REP_mem_alc.

In operation PUP-S44, the CXL storage 110 may output a write request REQ_WR through the CXL storage interface circuit 111a. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR.

In operation PUP-S45, the CXL memory 120 may output, through the CXL memory interface circuit 121a, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S44 and operation PUP-S45, the map data MD present in the CXL storage 110 may be stored in the dedicated area of the CXL memory 120.

In operation PUP-S46, the CXL storage 110 may output acknowledge information ACK_md through the CXL storage interface circuit 111a. The CXL switch SW_CXL may transfer the acknowledge information ACK_md to the host 101. In response to the acknowledge information ACK_md, the host 101 may recognize that the CXL storage 110 stores the map data MD in the CXL memory 120. Afterwards, the host 101, the CXL storage 110, and the CXL memory 120 may perform a normal operation (e.g., a read operation or a write operation).

Figure 5:
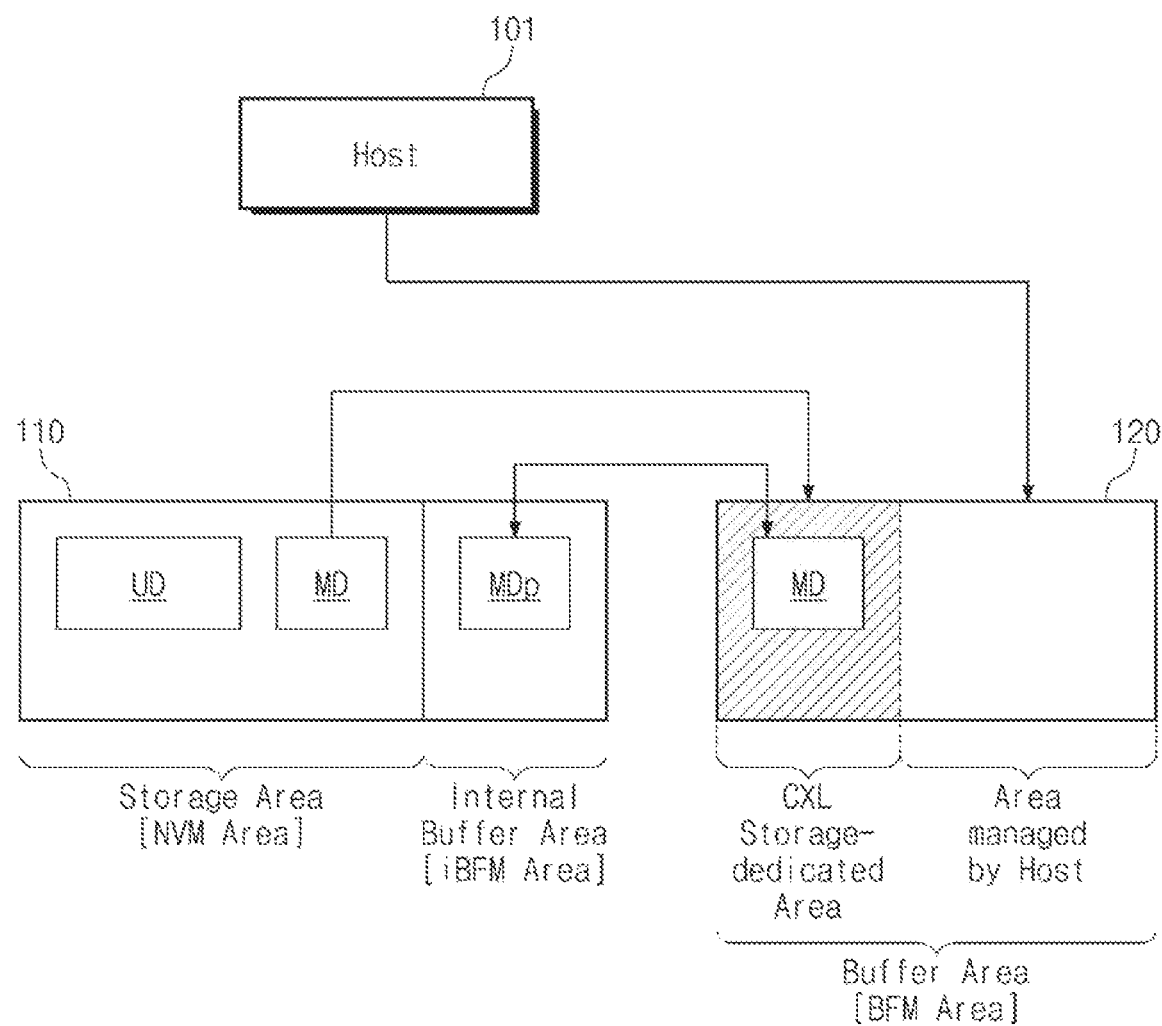
FIG. 5 is a diagram for describing an operation in which a computing system stores map data, according to some embodiments.

FIG. 5 is a diagram for describing an operation in which a computing system stores map data, according to some embodiments. For convenience of description and for brevity of drawing, components of the host 101, the CXL storage 110, and the CXL memory 120 are conceptually illustrated, and some unnecessary components are omitted.

Referring to FIGS. 3 to 5, the host 101 may allocate a partial area of the CXL memory 120 for a dedicated area of the CXL storage 110. In this case, the dedicated area of the CXL memory 120 may be accessed by the CXL storage 110 and may be used to store the map data MD of the CXL storage 110.

For example, as illustrated in FIG. 5, the nonvolatile memory NVM of the CXL storage 110 may store the user data UD and the map data MD. The map data MD of the CXL storage 110 may be stored in a partial area of the CXL memory 120 (e.g., a dedicated area allocated by the host 101). In this case, the dedicated area of the CXL memory 120 may be accessed by the CXL storage 110 through the CXL switch SW_CXL.

In an embodiment, the remaining area of the CXL memory 120, which is not allocated and which is other than the dedicated area, may be an area that is accessible by the host 101 or is managed by the host 101. In this case, the host 101 may access the remaining area of the CXL memory 120 through the CXL switch SW_CXL. In an embodiment, the remaining area of the CXL memory 120, which is not allocated for the dedicated area, may be used as a memory expander.

The area of the internal buffer memory iBFM of the CXL storage 110 may be used to store the partial map data MDp. A portion of the map data MD in the CXL storage-dedicated area of the CXL memory 120 may be copied or moved to an internal buffer area as the partial map data MDp.

As described above, depending on the request of the CXL storage 110, the host 101 may allocate at least a partial area of the CXL memory 120 for the dedicated area of the CXL storage 110. In this case, the CXL storage 110 may access a portion of the CXL memory 120, which is allocated for the dedicated area, and the host 101 may access the remaining area of the CXL memory 120 (i.e., the remaining area other than the dedicated area thus allocated). In an embodiment, both the access of the CXL storage 110 to the CXL memory 120 and the access of the host 101 to the CXL memory 120 may be performed through the same interface (e.g., a CXL interface or a CXL switch).

In an embodiment, when the system memory of the host 101 is insufficient, the host 101 may retrieve (or recover) the dedicated area of the CXL memory 120, which is allocated to the CXL storage 110 (i.e., an area for storing map data). The retrieved (or recovered) dedicated area may be used as the system memory by the host 101.

Figure 6:
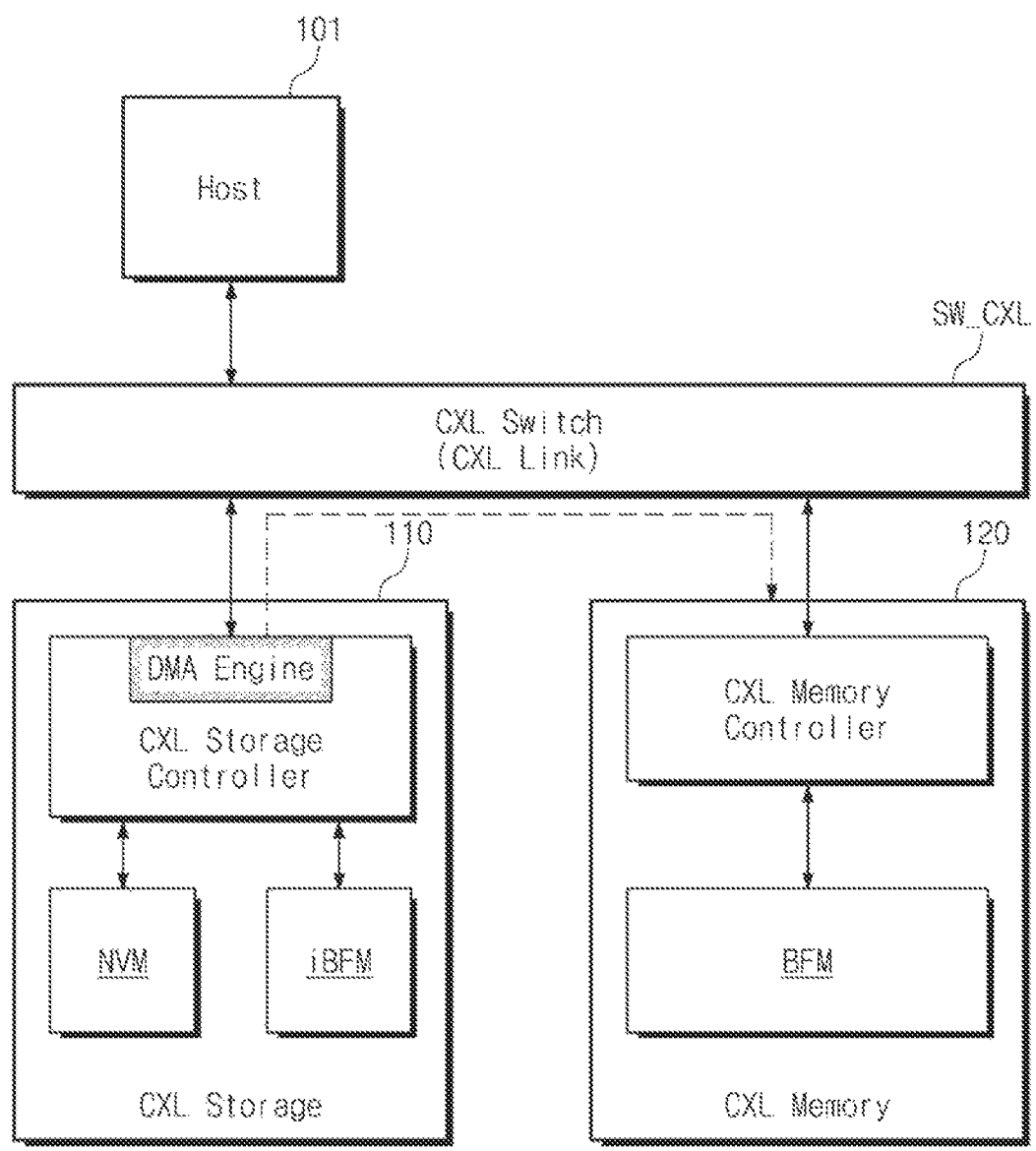
FIGS. 6 and 7 are diagrams for describing an operation in which map data are stored in a CXL memory, according to some embodiments.
Figure 7:
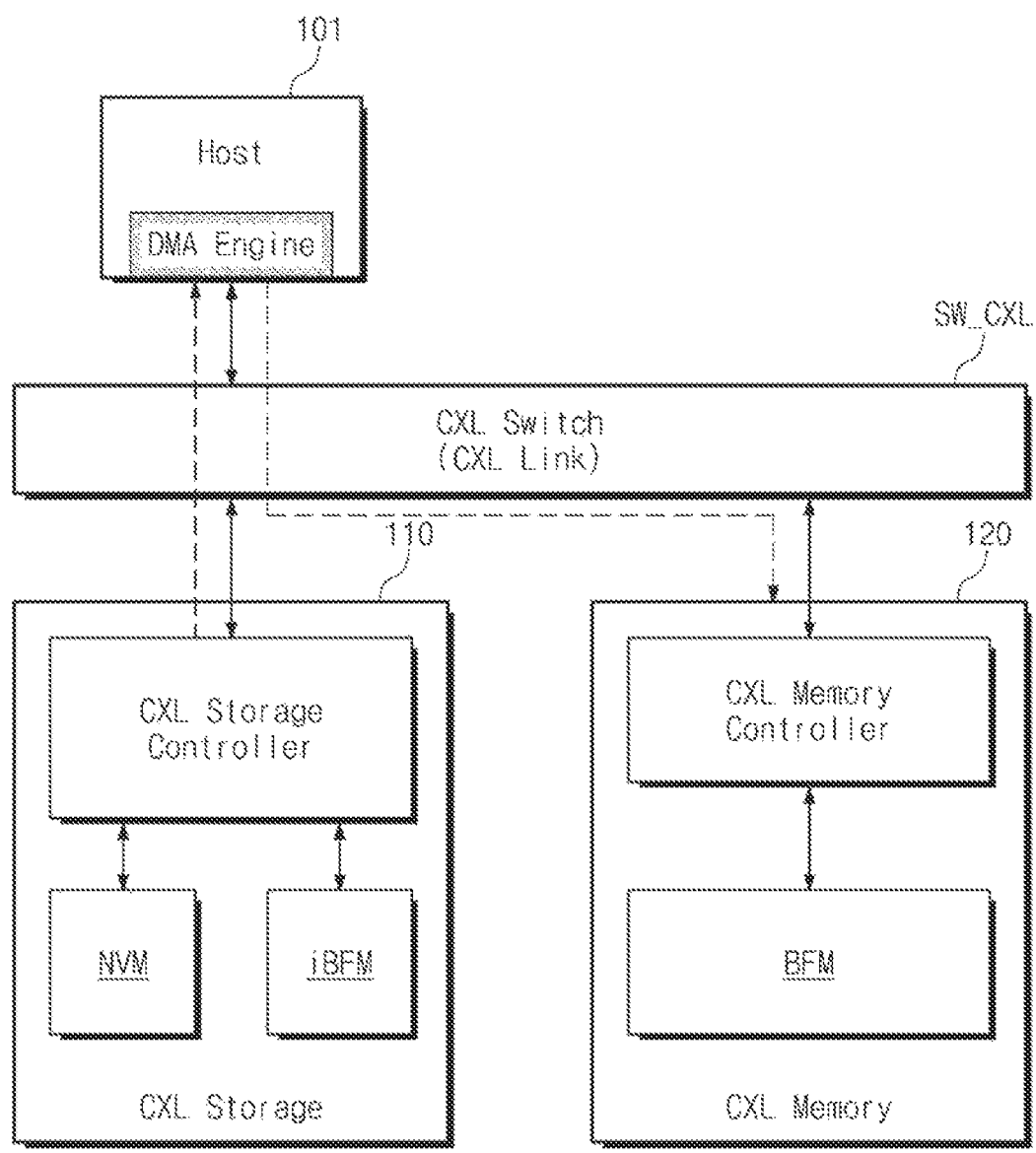

FIGS. 6 and 7 are diagrams for describing an operation in which map data are stored in a CXL memory, according to some embodiments. In an embodiment, the map data MD present in the CXL storage 110 may be transferred and stored to the CXL memory 120 from the CXL storage 110 through various manners.

As an example, the CXL storage 110 and the CXL memory 120 may exchange the map data MD based on a peer-to-peer (P2P) manner. For example, as illustrated in FIG. 6, the CXL storage controller 111 of the CXL storage 110 may include a direct memory access (DMA) engine. The DMA engine included in the CXL storage controller 111 may transfer the map data MD present in the nonvolatile memory NVM to the CXL memory 120 without the interference or control of the host 101. That is the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 7, the host 101 may include a direct memory access (DMA) engine. The DMA engine of the host 101 may read the map data MD from the CXL storage 110 and may transfer the map data MD thus read to the CXL memory 120. In an embodiment, the DMA engine of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as examples, and the present disclosure is not limited thereto. It may be understood that the transfer of map data from the CXL storage 110 to the CXL memory 120 is implemented in various manners using the CXL interface or the CXL switch. In an embodiment, the transfer (i.e., the backup or flush) of map data from the CXL memory 120 to the CXL storage 110 may also be implemented in a manner(s) similar to the above manners.

Figure 8:
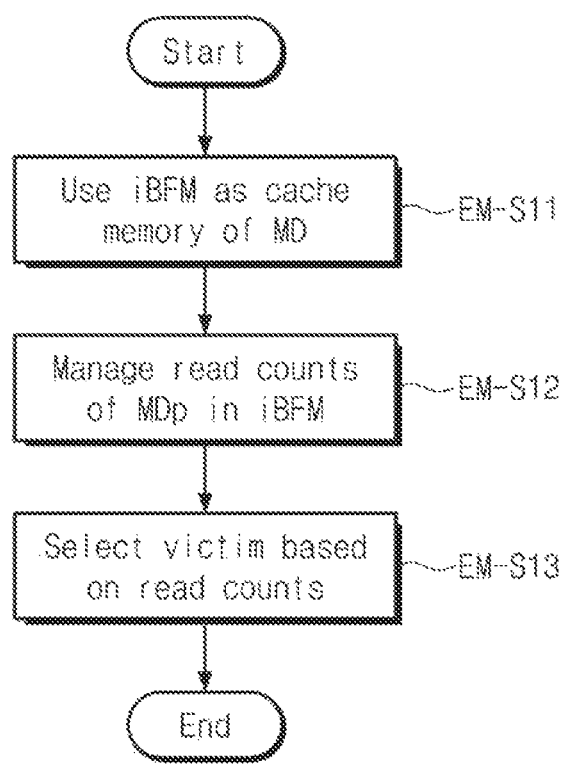
FIG. 8 illustrates an example in which CXL storage uses an internal buffer memory, according to some embodiments.

FIG. 8 illustrates a first embodiment in which the CXL storage 110 uses the internal buffer memory iBFM, according to some embodiments. Referring to FIGS. 2, 3, and 8, in operation EM-S11, the CXL storage controller 111 may use the internal buffer memory iBFM as a cache memory of the map data MD.

While the CXL storage controller 111 uses the internal buffer memory iBFM as a cache memory of the map data MD, in operation EM-S12, the CXL storage controller 111 may manage read counts of the partial map data MDp stored in the internal buffer memory iBFM.

For example, the partial map data MDp may include a plurality of address pairs, and each of the plurality of address pairs may include a logical block address and a physical block address that correspond to each other. In some embodiments, the logical block addresses may be mapped to the physical block addresses. The CXL storage controller 111 may manage read counts of the plurality of address pairs in the partial map data MDp.

When the CXL storage controller 111 refers to (e.g., reads) a specific address pair, the CXL storage controller 111 may increase the read count of the specific address pair. When the read operation for a specific logical block address is performed, the CXL storage controller 111 may refer to (or read) an address pair corresponding to the specific logical block address. That is, the read count may mean the number of times that the CXL storage controller 111 reads data corresponding to the specific logical block address or physical block address from among the user data UD.

In operation EM-S13, the CXL storage controller 111 may select a victim based on the read counts. For example, when the CXL storage controller 111 writes data in the nonvolatile memory NVM by using a new logical block address, the CXL storage controller 111 may generate an address pair corresponding the new logical block address and may write the generated address pair in the internal buffer memory iBFM. In some embodiments, when an address pair corresponding to a logical block address targeted for the read operation of the CXL storage controller 111 is absent from the internal buffer memory iBFM, the CXL storage controller 111 may read a corresponding address pair from the CXL memory 120 and may write the read address pair in the internal buffer memory iBFM.

In the case where the capacity (or free space) to store an address pair is absent from the internal buffer memory iBFM when the CXL storage controller 111 intends to write a new address pair in the internal buffer memory iBFM, the CXL storage controller 111 may select a victim of address pairs of the partial map data MDp in the internal buffer memory iBFM. For example, the CXL storage controller 111 may remove an address pair whose read count is the smallest, from among the address pairs of the partial map data MDp from the internal buffer memory iBFM. The CXL storage controller 111 may write the new address pair in the capacity (or free space) that is secured by removing the address pair corresponding to the victim.

Figure 9:
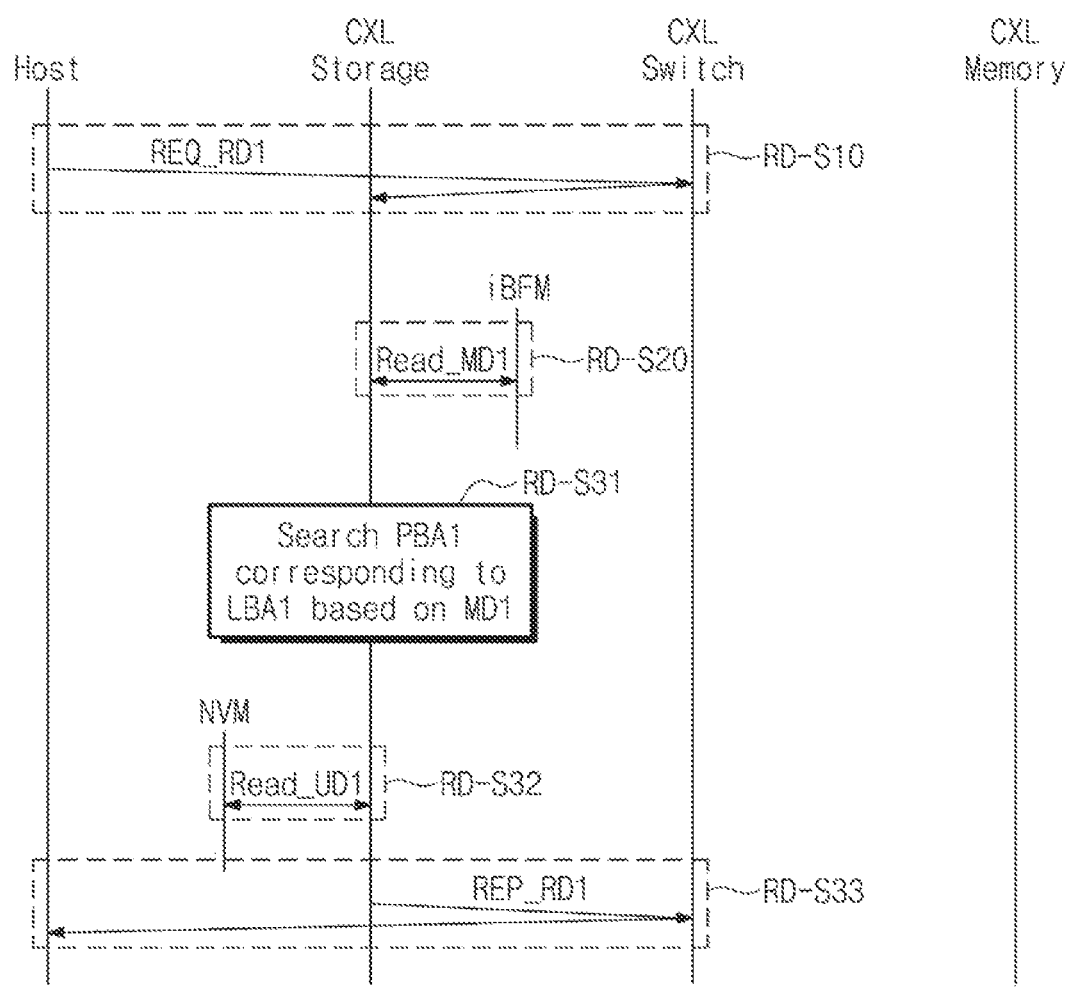
FIG. 9 is a flowchart illustrating an example of a read operation for CXL storage of FIG. 2, according to some embodiments.

FIG. 9 is a flowchart illustrating an example of a read operation for CXL storage of FIG. 2, according to some embodiments. In an embodiment, the read operation for the CXL storage 110 according to the flowchart of FIG. 9 may be performed after the initialization operation of FIG. 4 is performed (i.e., after the map data MD of the CXL storage 110 are stored in the dedicated area of the CXL memory 120). In an embodiment, the read operation that is performed when the CXL storage 110 uses the internal buffer memory iBFM as a cache memory and a hit event occurs is illustrated in FIG. 9 as an example.

Referring to FIGS. 2, 3, and 9, in operation RD-S10, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an embodiment, the first read request REQ_RD1 may refer to a request for reading first user data UD1 stored in the CXL storage 110 and may include a first logical block address LBA1 corresponding to the first user data UD1.

The hit event may occur when an address pair corresponding to the first logical block address LBA1 is present in the internal buffer memory iBFM as a portion of the partial map data MDp. When the hit event occurs, in operation RD-S20, the CXL storage 110 may read first map data MD1 (e.g., an address pair) corresponding the first logical block address LBA1 from the internal buffer memory iBFM.

In operation RD-S31, the CXL storage 110 may search for a first physical block address PBA1 corresponding the first logical block address LBA1 based on the first map data MD1. For example, the FTL 111d of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an embodiment, the CXL storage controller 111 may read the first user data UD1 from the nonvolatile memory NVM by using the NAND interface circuit 111f.

In operation RD-S33, the CXL storage 110 may output a first read response REP_RD1 to the first read request REQ_RD1 through the CXL storage interface circuit 111a. The CXL switch SW_CXL may transfer the first read response REP_RD1 to the host 101. In an embodiment, the first read response REP_RD1 may include the first user data UD1 requested through the first read request REQ_RD1. The host 101 may obtain the first user data UD1 through the first read response REP_RD1.

Figure 10:
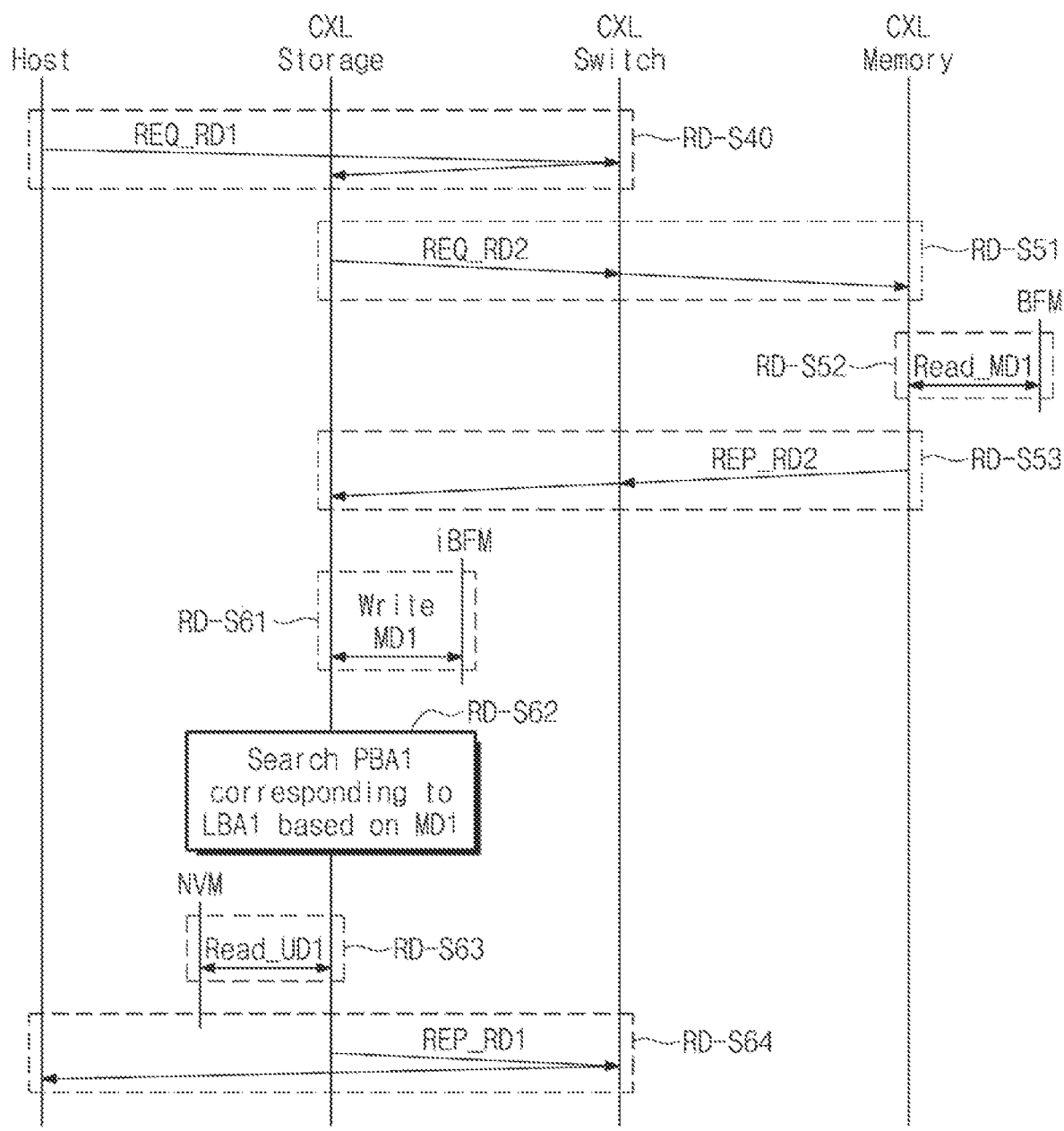
FIG. 10 is a flowchart illustrating an example of a read operation for CXL storage of FIG. 2, according to some embodiments.

FIG. 10 is a flowchart illustrating an example of a read operation for CXL storage of FIG. 2, according to some embodiments. In an embodiment, the read operation for the CXL storage 110 according to the flowchart of FIG. 10 may be performed after the initialization operation of FIG. 4 is performed (i.e., after the map data MD of the CXL storage 110 are stored in the dedicated area of the CXL memory 120). In an embodiment, the read operation that is performed when the CXL storage 110 uses the internal buffer memory iBFM as a cache memory and a miss event occurs is illustrated in FIG. 10 as an example.

Referring to FIGS. 2, 3, and 10, in operation RD-S40, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an embodiment, the first read request REQ_RD1 may refer to a request for reading first user data UD1 stored in the CXL storage 110 and may include a first logical block address LBA1 corresponding to the first user data UD1.

The miss event may occur when an address pair corresponding to the first logical block address LBA1 is absent from the internal buffer memory iBFM as a portion of the partial map data MDp. When the miss event occurs, in operation RD-S51, the CXL storage 110 may output a second read request REQ_RD2 through the CXL storage interface circuit 111a in response to the first read request REQ_RD1. The CXL switch SW_CXL may transfer the second read request REQ_RD2 to the CXL memory 120. In an embodiment, the second read request REQ_RD2 may refer to a request for reading first map data MD1 corresponding to the first logical block address LBA1. That is, the second read request REQ_RD2 may refer to a request for reading the first map data MD1 from the CXL memory 120. The second read request REQ_RD2 may include information about a memory address (e.g., a logical address or a virtual address) of the CXL memory 120, which indicates an area where the first map data MD1 are stored.

In operation RD-S52, the CXL memory 120 may read the first map data MD1 in response to the second read request REQ_RD2. For example, the CXL memory controller 121 of the CXL memory 120 may read the first map data MD1 from the area corresponding to the memory address (e.g., a logical address or a virtual address) included in the second read request REQ_RD2. In an embodiment, the CXL memory controller 121 may read the first map data MD1 (e.g., an address pair) from the buffer memory BFM by using the buffer memory interface circuit 121d.

In operation RD-S53, the CXL memory 120 may output a second read response REP_RD2 including the first map data MD1 through the CXL memory interface circuit 121a. The CXL switch SW_CXL may transfer a second read response REP_RD2 to the CXL storage 110. In an embodiment, the first map data MD1 included in the second read response REP_RD2 received through the CXL switch SW_CXL may be stored or temporarily stored in the RAM 111c of the CXL storage controller 111.

In an embodiment, when the first map data MD1 corresponding to the first logical block address LBA1 is already present in the RAM 111c of the CXL storage controller 111, operation RD-S51 to operation RD-S53 (i.e., operations for loading the first map data MD1 from the CXL memory 120) may be omitted.

In operation RD-S61, the CXL storage 110 may write the first map data MD1 in the internal buffer memory iBFM. When the capacity to store the first map data MD1 is insufficient in the internal buffer memory iBFM, the CXL storage 110 may remove an address pair whose read count is the smallest, from among address pairs of the partial map data MDp and may write the first map data MD1 in the internal buffer memory iBFM.

In operation RD-S62, the CXL storage 110 may search for the first physical block address PBA1 corresponding the first logical block address LBA1 based on the first map data MD1. For example, the FTL 111d of the CXL storage controller 111 may search for the first physical block address PBA1 corresponding to the first logical block address LBA1 based on the first map data MD1.

In operation RD-S63, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an embodiment, the CXL storage controller 111 may read the first user data UD1 from the nonvolatile memory NVM by using the NAND interface circuit 111f.

In operation RD-S64, the CXL storage 110 may output a first read response REP_RD1 to the first read request REQ_RD1 through the CXL storage interface circuit 111a. The CXL switch SW_CXL may transfer the first read response REP_RD1 to the host 101. In an embodiment, the first read response REP_RD1 may include the first user data UD1 requested through the first read request REQ_RD1. The host 101 may obtain the first user data UD1 through the first read response REP_RD1.

In an embodiment, operation RD-S40 and operation RD-S64 corresponding to the communications between the host 101 and the CXL storage 110 may be performed based on the CXL.io, and operation RD-S51 to operation RD-S53 corresponding to the communications between the CXL storage 110 and the CXL memory 120 may be performed based on the CXL.mem. However, the present disclosure is not limited thereto. For example, the communications between the host 101, the CXL storage 110, and the CXL memory 120 may be performed through the CXL switch SW_CXL (i.e., a common interface, a common link, or a common switch).

Figure 11:
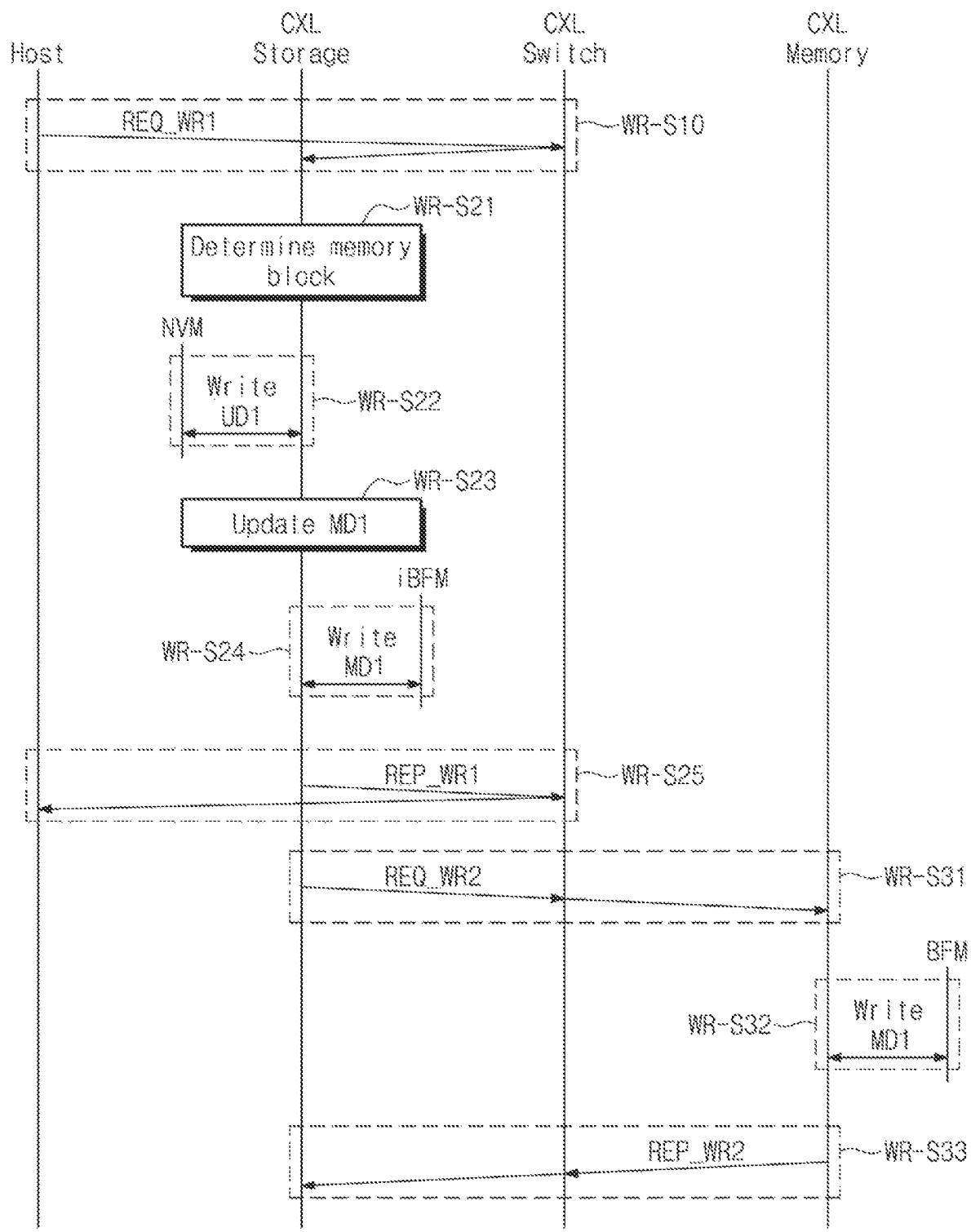
FIG. 11 is a flowchart illustrating an example of a write operation for CXL storage of FIG. 2, according to some embodiments.

FIG. 11 is a flowchart illustrating an example of a write operation for CXL storage of FIG. 2, according to some embodiments. In an embodiment, the write operation for the CXL storage 110 according to the flowchart of FIG. 11 may be performed after the initialization operation of FIG. 4 is performed (i.e., after the map data MD of the CXL storage 110 are stored in the dedicated area of the CXL memory 120). An embodiment where the CXL storage 110 uses the internal buffer memory iBFM as a cache memory is illustrated in FIG. 11 as an example.

Referring to FIGS. 2, 3, and 11, in operation WR-S10, the host 101 may output a first write request REQ_WR1 through the CXL host interface circuit 101a. The CXL switch SW_CXL may transfer the first write request REQ_WR1 to the CXL storage 110. In an embodiment, the first write request REQ_WR1 may refer to a request for writing the first user data UD1 in the CXL storage 110.

In operation WR-S21, the CXL storage 110 may determine a memory block in which the first user data UD1 are to be written, in response to the first write request REQ_WR1. For example, the FTL 111d of the CXL storage controller 111 may manage block information about a memory block, which is free, capable of being written, or capable of being allocated, from among memory blocks included in the nonvolatile memory NVM. The FTL 111d may select a memory block, in which the first user data UD1 are to be written, based on the block information.

In operation WR-S22, the CXL storage 110 may write the first user data UD1 in the selected memory block. For example, the CXL storage controller 111 may control the nonvolatile memory NVM such that the first user data UD1 are written in the selected memory block. In an embodiment, the CXL storage controller 111 may write the first user data UD1 in the nonvolatile memory NVM by using the NAND interface circuit 111f.

When the first user data UD1 are completely written in the nonvolatile memory NVM (i.e., when a program operation for the nonvolatile memory NVM is passed), in operation WR-S23, the CXL storage 110 may update the first map data MD1 or may generate the first map data MD1. For example, the first map data MD1 may include information (e.g., an address pair) indicating that the first user data UD1 corresponding to the first logical block address LBA1 are stored in an area of the nonvolatile memory NVM, which corresponds to the first physical block address PBA1. That is, the CXL storage 110 may generate the first map data MD1 indicating that the first user data UD1 corresponding to the first logical block address LBA1 are stored in the area corresponding to the first physical block address PBA1.

In operation WR-S24, the CXL storage 110 may write the first map data MD1 in the internal buffer memory iBFM. When the capacity to store the first map data MD1 is insufficient in the internal buffer memory iBFM, the CXL storage 110 may remove an address pair whose read count is the smallest, from among address pairs of the partial map data MDp and may write the first map data MD1 in the internal buffer memory iBFM.

In operation WR-S25, the CXL storage 110 may output a first write response REP_WR1 to the first write request REQ_WR1 through the CXL storage interface circuit 111a. The CXL switch SW_CXL may transfer the first write response REP_WR1 to the host 101. In response to the first write response REP_WR1, the host 101 may determine that the first user data UD1 corresponding to the first write request REQ_WR1 are normally stored in the CXL storage 110.

After the write operation for the CXL storage 110 requested by the host 101 is completed, the CXL storage 110 may perform a map data update operation of the CXL memory 120. For example, in operation WR-S31, the CXL storage 110 may output a second write request REQ_WR2 through the CXL storage interface circuit 111a. The CXL switch SW_CXL may transfer the second write request REQ_WR2 to the CXL memory 120.

In an embodiment, the second write request REQ_WR2 may refer to a request for writing the first map data MD1, which are updated or generated as the first user data UD1 are stored, in the CXL memory 120. The second write request REQ_WR2 may include a memory address at which the first map data MD1 are to be stored. The memory address included in the second write request REQ_WR2 may indicate the area of the CXL memory 120, which is dedicated for the CXL storage 110.

In operation WR-S32, the CXL memory 120 may store the first map data MD1 in the corresponding area in response to the second write request REQ_WR2. For example, the CXL memory 120 may write the first map data MD1 in the area corresponding to the memory address included in the second write request REQ_WR2.

In operation WR-S33, the CXL memory 120 may output a second write response REP_WR2 to the second write request REQ_WR2 through the CXL memory interface circuit 121a. The CXL switch SW_CXL may transfer the second write response REP_WR2 to the CXL storage 110.

In an embodiment, operation WR-S31 to operation WR-S33 (i.e., an operation of storing map data in the CXL memory 120 or an operation of updating map data) may be performed whenever the write operation for the CXL storage 110 is completed. In some embodiments, operation WR-S31 to operation WR-S33 may be performed when the size of map data updated or newly generated reaches a given value. In some embodiments, operation WR-S31 to operation WR-S33 may be performed periodically. However, the present disclosure is not limited thereto. For example, map data that are generated or updated during the operation of the CXL storage 110 may be stored in the CXL memory 120 depending on various operation policies.

Figure 12:
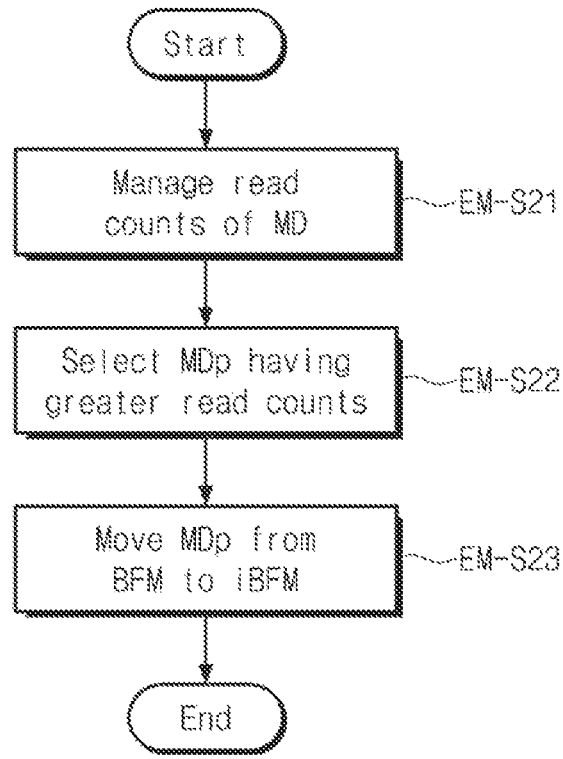
FIG. 12 illustrates an example in which CXL storage uses an internal buffer memory, according to some embodiments.

FIG. 12 illustrates an example in which the CXL storage 110 uses the internal buffer memory iBFM, according to some embodiments. Referring to FIGS. 2, 3, and 12, the CXL storage controller 111 may use the internal buffer memory iBFM and the CXL memory 120 as a dynamic tiered-memory. The internal buffer memory iBFM may be a second tier memory adjacent to the CXL storage controller 111, and the CXL memory 120 may be a first tier memory lower in level than the internal buffer memory iBFM. The CXL storage controller 111 may distribute and store the map data MD in the internal buffer memory iBFM and the CXL memory 120. Address pairs of partial map data stored in the internal buffer memory iBFM and address pairs of map data stored in the CXL memory 120 may be dynamically changed.

In operation EM-S21, the CXL storage controller 111 may manage read counts of all the address pairs in the map data MD. The CXL storage controller 111 may manage read counts of address pairs of the map data MD distributed and stored in the internal buffer memory iBFM and the CXL memory 120.

While the CXL storage controller 111 manages the read counts of the map data MD, in operation EM-S22, the CXL storage controller 111 may select address pairs, which have greater read counts, from among the address pairs of the map data MD as the partial map data MDp. In some embodiments, the address pairs may be selected based on a threshold that may be preset or set dynamically.

In operation EM-S23, the CXL storage controller 111 may move the selected partial map data MDp from the CXL memory 120 to the internal buffer memory iBFM. For example, after the partial map data MDp are stored in the internal buffer memory iBFM, a portion of the map data MD, which corresponds to the partial map data MDp, may be removed from the CXL memory 120.

To maintain the continuity of read counts, the CXL storage controller 111 may separately back up the read counts to the nonvolatile memory NVM. some embodiments, the CXL storage controller 111 may incorporate the read counts in the map data MD as a portion of the map data MD.

In an embodiment, after the initialization operation of FIG. 4 is completed, the CXL storage 110 may fetch the partial map data MDp from the CXL memory 120. In an embodiment, the CXL storage controller 111 may perform tiering periodically based on a time period or based on the number of times the address pairs are read. In some embodiments, the CXL storage controller 111 may perform tiering based on a frequency at which the address pairs are read. For example, the tiering may include moving address pairs having relatively small read counts from among the address pairs in the partial map data MDp of the internal buffer memory iBFM to the CXL memory 120 and moving address pairs having relatively great read counts from among address pairs of map data stored in the CXL memory 120 to the internal buffer memory iBFM. As another example, the tiering may include moving the partial map data MDp to the CXL memory 120 such that the map data MD are restored, and moving address pairs having greater read counts from among address pairs of the map data MD to the internal buffer memory iBFM as the partial map data MDp.

In an embodiment, the read operation that is performed when the CXL storage 110 uses the internal buffer memory iBFM and the CXL memory 120 as the dynamic tiered-memory and the hit event occurs is identical to the read operation described with reference to FIG. 9. Thus, additional description will be omitted to avoid redundancy.

In an embodiment, the read operation that is performed when the CXL storage 110 uses the internal buffer memory iBFM and the CXL memory 120 as the dynamic tiered-memory and the miss event occurs is identical to the read operation described with reference to FIG. 10 except that there is omitted operation RD-S61 where the first map data MD1 are written in the internal buffer memory iBFM. Thus, additional description will be omitted to avoid redundancy.

In an embodiment, the write operation that is performed when the CXL storage 110 uses the internal buffer memory iBFM and the CXL memory 120 as the dynamic tiered-memory is identical to the write operation described with reference to FIG. 11 except that there is omitted operation WR-S24 where the first map data MD1 are written in the internal buffer memory iBFM. Thus, additional description will be omitted to avoid redundancy.

Figure 13:
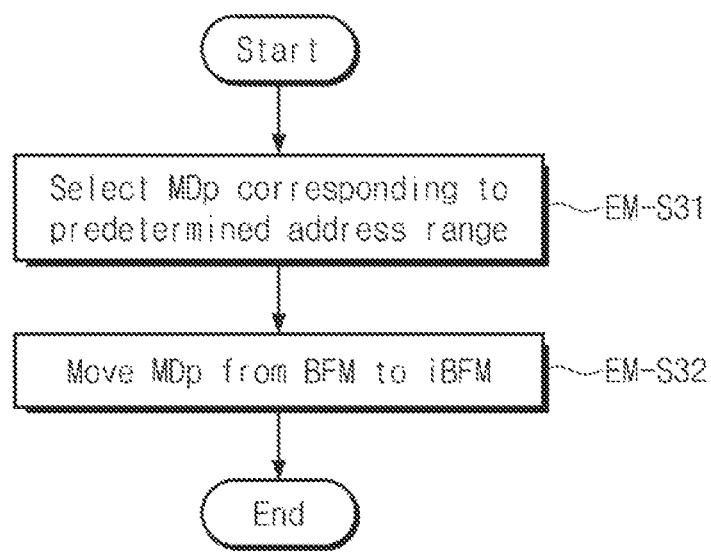
FIG. 13 illustrates an example in which CXL storage uses an internal buffer memory, according to some embodiments.

FIG. 13 illustrates an example in which the CXL storage 110 uses the internal buffer memory iBFM, according to some embodiments. Referring to FIGS. 2, 3, and 13, the CXL storage controller 111 may use the internal buffer memory iBFM and the CXL memory 120 as a static tiered-memory. The internal buffer memory iBFM may be a second tier memory adjacent to the CXL storage controller 111, and the CXL memory 120 may be a first tier memory lower in level than the internal buffer memory iBFM. The CXL storage controller 111 may distribute and store the map data MD in the internal buffer memory iBFM and the CXL memory 120. Address pairs of the partial map data MDp stored in the internal buffer memory iBFM and address pairs of map data stored in the CXL memory 120 may be fixed.

In operation EM-S31, the CXL storage controller 111 may select the partial map data MDp corresponding to a given address range from among the map data MD of the CXL memory 120. The given address range may be predetermined. For example, the CXL storage controller 111 may select address pairs corresponding to logical block addresses of a given range from among address pairs of the map data MD as the partial map data MDp.

In operation EM-S32, the CXL storage controller 111 may move the selected partial map data MDp from the CXL memory 120 to the internal buffer memory iBFM. For example, after the partial map data MDp are stored in the internal buffer memory iBFM, a portion of the map data MD, which corresponds to the partial map data MDp, may be removed from the CXL memory 120. In an embodiment, after the initialization operation of FIG. 4 is completed, the CXL storage 110 may fetch the partial map data MDp from the CXL memory 120.

In an embodiment, the read operation that is performed when the CXL storage 110 uses the internal buffer memory iBFM and the CXL memory 120 as the static tiered-memory and the hit event occurs is identical to the read operation described with reference to FIG. 9. Thus, additional description will be omitted to avoid redundancy.

In an embodiment, the read operation that is performed when the CXL storage 110 uses the internal buffer memory iBFM and the CXL memory 120 as the static tiered-memory and the miss event occurs is identical to the read operation described with reference to FIG. 10 except that there is omitted operation RD-S61 where the first map data MD1 are written in the internal buffer memory iBFM. Thus, additional description will be omitted to avoid redundancy.

In an embodiment, the write operation that is performed when the CXL storage 110 uses the internal buffer memory iBFM and the CXL memory 120 as the static tiered-memory is identical to the write operation described with reference to FIG. 11 except that there is omitted operation WR-S24 where the first map data MD1 are written in the internal buffer memory iBFM. Thus, additional description will be omitted to avoid redundancy.

Figure 14:
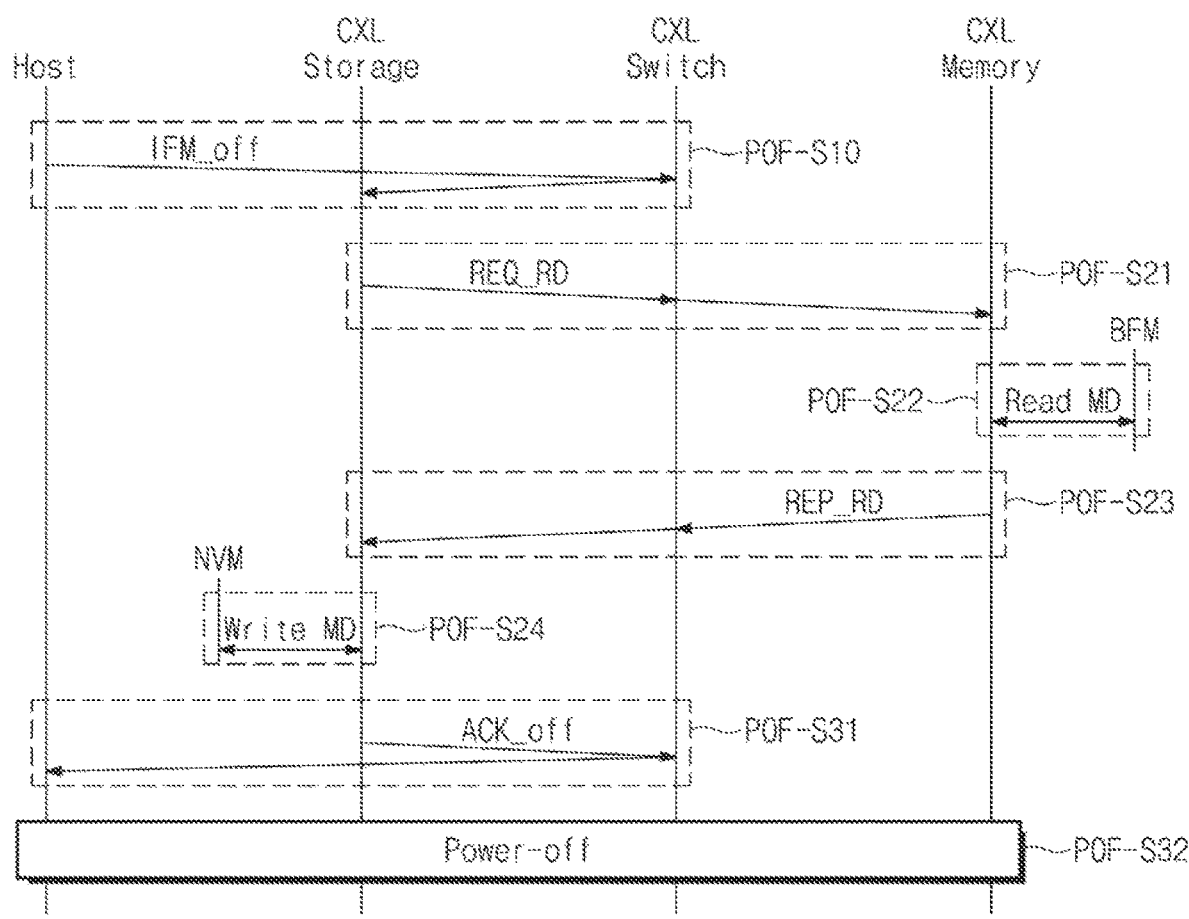
FIG. 14 is a flowchart illustrating a power-off operation of a computing system of FIG. 2, according to some embodiments.

FIG. 14 is a flowchart illustrating a power-off operation of a computing system of FIG. 2, according to some embodiments. In an embodiment, a power-off operation of a computing system will be described with reference to FIG. 14, but the present disclosure is not limited thereto. For example, it may be understood that the operating method of FIG. 14 is applicable to the power-off operation or reset operation of each of various components (e.g., a host, CXL storage, a CXL memory, and a CXL switch) included in the computing system.

Referring to FIGS. 2 and 14, in operation POF-S10, the host 101 may output power-off information IFM_off through the CXL host interface circuit 101a. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs a power-off operation.

In operation POF-S21, the CXL storage 110 may output a read request REQ_RD through the CXL storage interface circuit 111*a* in response to the power-off information IFM_off. The CXL switch SW_CXL may transfer the read request REQ_RD to the CXL memory 120. In an embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121*a*. The CXL switch SW_CXL may transfer the read response REP_RD to the CXL storage 110.

In operation POF-S24, the CXL storage 110 may write the map data MD included in the read response REP_RD in the nonvolatile memory NVM. In an embodiment, the CXL storage 110 may store the map data MD in a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

Afterwards, in operation POF-S32, the host 101, the CXL storage 110, the CXL memory 120, and the CXL switch SW_CXL may be powered off. For example, a power that is provided to the host 101, the CXL storage 110, the CXL memory 120, and the CXL switch SW_CXL may be interrupted.

The power-off operation described with reference to FIG. 14 is provided as an example, and the present disclosure is not limited thereto. For example, in the embodiment of FIG. 14, after the CXL storage 110 stores the map data MD present in the CXL memory 120 in the nonvolatile memory NVM, the CXL storage 110 may provide notification that the map data MD are completely backed up, by sending the response ACK_off to the host 101 (i.e., an interrupt manner). In some embodiments, the CXL storage 110 may store the map data MD present in the CXL memory 120 in the nonvolatile memory NVM and may then set a value of a specific register to a given value. The host 101 may determine whether the map data MD are completely backed up, by periodically checking the value of the specific register of the CXL storage 110 (i.e., a polling manner). In some embodiments, the CXL storage 110 may be configured to complete the backup operation for the map data MD within a given time from a point in time when the power-off information IFM_off is received from the host 101 (i.e., a time-out manner). As described above, the CXL storage 110 may transfer information about backup completion of the map data MD to the host 101 through at least one of various manners.

In an embodiment, the power-off operation may be changed depending on an operation manner of the CXL storage 110. For example, when the CXL storage 110 performs the write operation, the CXL storage 110 may perform the program operation on the nonvolatile memory NVM and thus may update the map data MD.

In an embodiment, the map data update operation may be performed only on the CXL memory 120 or the internal buffer memory iBFM of the CXL storage 110. In this case, the map data MD present in the CXL memory 120 or the partial map data MDp present in the internal buffer memory iBFM of the CXL storage 110 may be up-to-date information, and the map data MD present in the nonvolatile memory NVM are not up-to-date information. That is, when the operation of updating the map data MD is performed only on the CXL memory 120 or the internal buffer memory iBFM of the CXL storage 110, up-to-date information about the map data MD is maintained only in the CXL memory 120 or the internal buffer memory iBFM of the CXL storage 110; for this reason, when the CXL storage 110, the CXL memory 120, or the computing system 100 is powered off, an operation of flushing, backing up, or dumping the map data MD from the CXL memory 120 is required.

In an embodiment, the map data update operation may be first performed with respect to the map data MD present in the nonvolatile memory NVM and may then be performed with respect to the map data MD present in the CXL memory 120 or the partial map data MDp present in the internal buffer memory iBFM of the CXL storage 110, through the background operation. In this case, because the map data MD stored in the nonvolatile memory NVM are guaranteed to be up-to-date information, the operation of flushing, dumping, or backing up the map data MD from the CXL memory 120 may not be required when the CXL storage 110, the CXL memory 120, or the computing system 100 is powered off.

In an embodiment, the map data update operation may be first performed with respect to the map data MD present in the CXL memory 120 or the partial map data MDp present in the internal buffer memory iBFM of the CXL storage 110 and may then be performed with respect to the map data MD present in the nonvolatile memory NVM through the background operation. In this case, the map data MD present in the CXL memory 120 or the partial map data MDp present in the internal buffer memory iBFM of the CXL storage 110 may be up-to-date information, and the map data MD present in the nonvolatile memory NVM may not be up-to-date information.

As such, when the CXL storage 110, the CXL memory 120, or the computing system 100 is powered off, at least a portion of the map data MD of the CXL memory 120 or the partial map data MDp present in the internal buffer memory iBFM of the CXL storage 110 has to be backed up to the nonvolatile memory NVM of the CXL storage 110. In an embodiment, at least a portion of the map data MD or the partial map data MDp to be backed up to the nonvolatile memory NVM may be the up-to-date map data MD that are not stored in the nonvolatile memory NVM. In an embodiment, the CXL storage 110 may manage or store flag information or table information indicating that the map data MD stored in the nonvolatile memory NVM are up-to-date information.

As described above, when the CXL storage 110, the CXL memory 120, or the computing system 100 is powered off, depending on a way to manage the map data MD (i.e., depending on a place where up-to-date information is managed), the map data MD may be selectively flushed, backed up, or dumped to the nonvolatile memory NVM of the CXL storage 110 from the CXL memory 120 or the internal buffer memory iBFM of the CXL storage 110.

Figure 15:
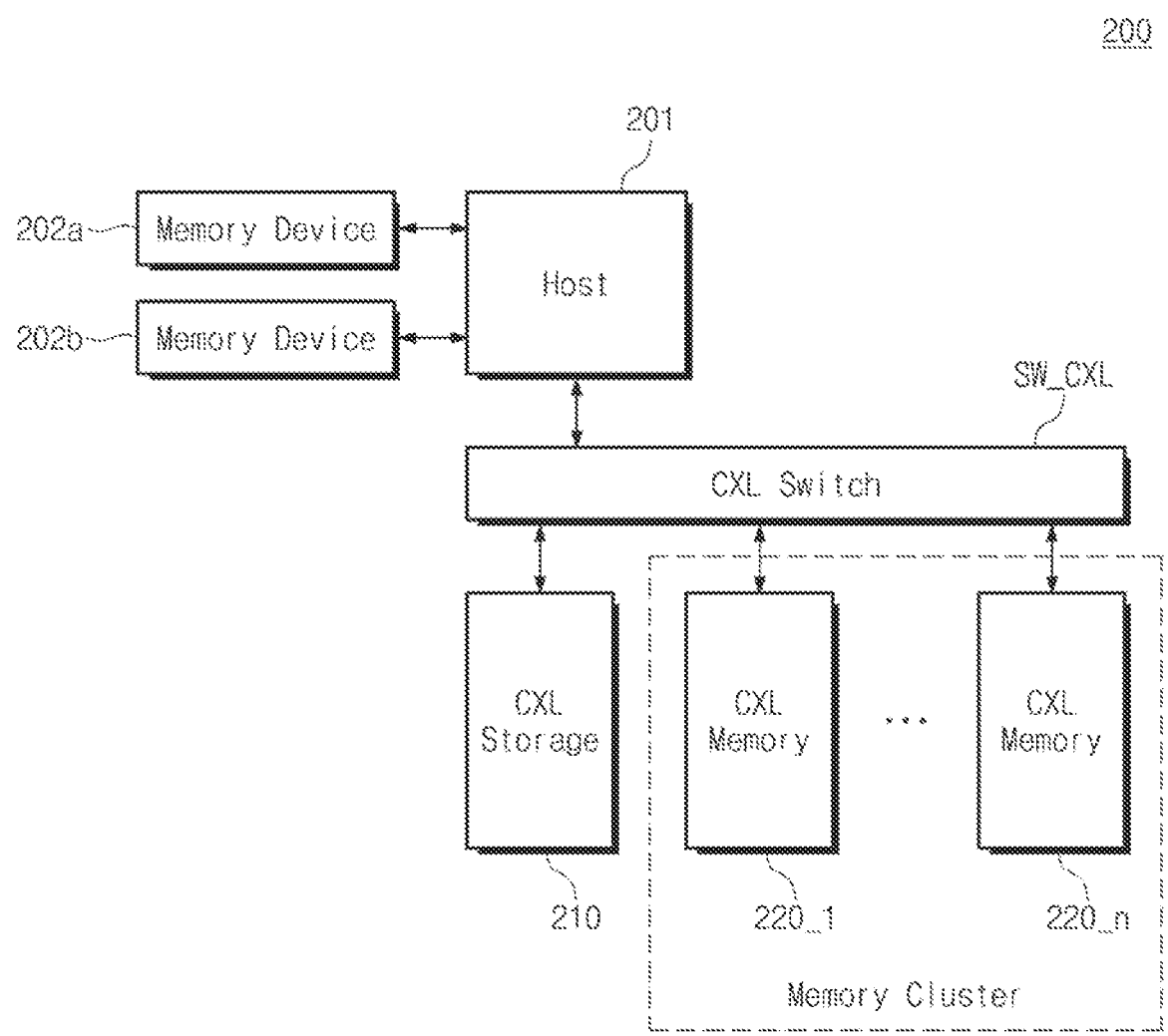
FIG. 15 is a block diagram illustrating a computing system according to some embodiments.

FIG. 15 is a block diagram illustrating a computing system according to some embodiments. Below, for convenience of description, additional description associated with the components described above will be omitted to avoid redundancy. Referring to FIG. 15, a computing system 200 may include a host 201, a plurality of memory devices 202a and 202b, the CXL switch SW_CXL, CXL storage 210, and a plurality of CXL memories 220_1 to 220_n.

The host 201 may be directly connected with the plurality of memory devices 202a and 202b. The host 201, the CXL storage 210, and the plurality of CXL memories 220_1 to 220_n may be connected with the CXL switch SW_CXL and may communicate with each other through the CXL switch SW_CXL.

In an embodiment, each of the plurality of CXL memories 220_1 to 220_n may have a structure similar to that of the CXL memory 120 described with reference to FIGS. 2 to 10. That is, each of the plurality of CXL memories 220_1 to 220_n may be implemented with an individual memory device or memory module and may be connected with the CXL switch SW_CXL through different physical ports. That is, as the plurality of CXL memories 220_1 to 220_n are connected with the CXL switch SW_CXL, a memory area (or capacity) that is managed by the host 201 may increase.

In an embodiment, the host 201 may manage the plurality of CXL memories 220_1 to 220_n as one memory cluster. In an embodiment, the host 201 may allocate at least some of the plurality of CXL memories 220_1 to 220_n for a memory dedicated for the CXL storage 210. In some embodiments, the host 201 may allocate at least a partial area of each of the plurality of CXL memories 220_1 to 220_n for a memory dedicated for the CXL storage 210.

Figure 16:
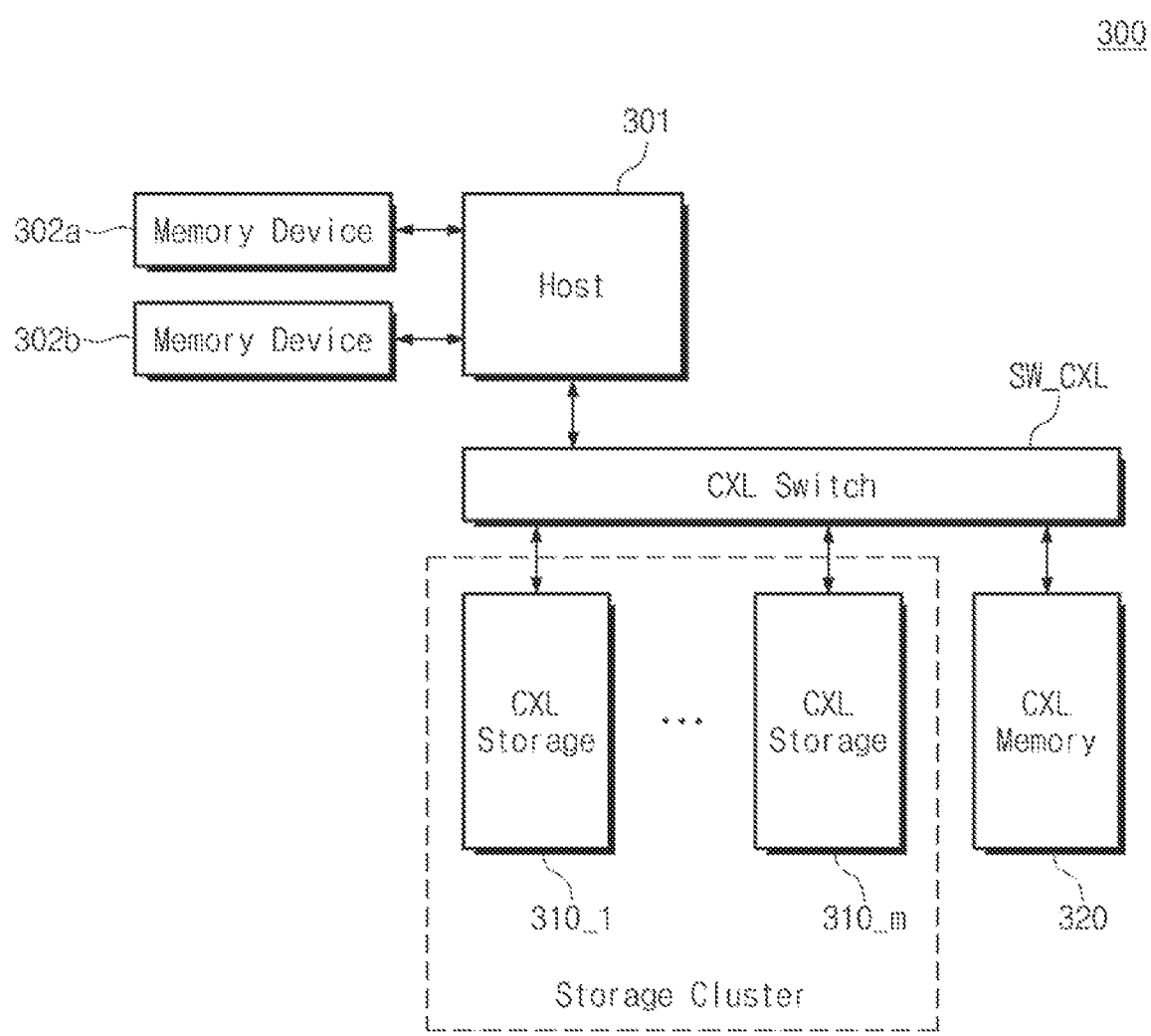
FIG. 16 is a block diagram illustrating a computing system according to some embodiments.

FIG. 16 is a block diagram illustrating a computing system according to some embodiments. Below, for convenience of description, additional description associated with the components described above will be omitted to avoid redundancy. Referring to FIG. 16, a computing system 300 may include a host 301, a plurality of memory devices 302a and 302b, the CXL switch SW_CXL, a plurality of CXL storages 310_1 to 310_m, and a CXL memory 320.

The host 301 may be directly connected with the plurality of memory devices 302a and 302b. The host 301, the plurality of CXL storages 310_1 to 310_m, and the CXL memory 320 may be connected with the CXL switch SW_CXL and may communicate with each other through the CXL switch SW_CXL.

In an embodiment, each of the plurality of CXL storages 310_1 to 310_m may have a structure similar to that of the CXL storage 110 described with reference to FIGS. 2 to 10. That is, each of the plurality of CXL storages 310_1 to 310_m may be implemented with an individual storage device or storage module and may be connected with the CXL switch SW_CXL through different physical ports. That is, as the plurality of CXL storages 310_1 to 310_m are connected with the CXL switch SW_CXL, a memory area (or capacity) that is available by the host 201 may increase.

In an embodiment, at least a partial area of the CXL memory 320 may be allocated for an area dedicated for the plurality of CXL storages 310_1 to 310_m. For example, the host 301 may manage the plurality of CXL storages 310_1 to 310_m as one storage cluster and may allocate a partial area of the CXL memory 320 for a dedicated area of one storage cluster. In some embodiments, the host 201 may allocate partial areas of the CXL memory 320 for dedicated areas of the respective CXL storages 310_1 to 310_m.

Figure 17:
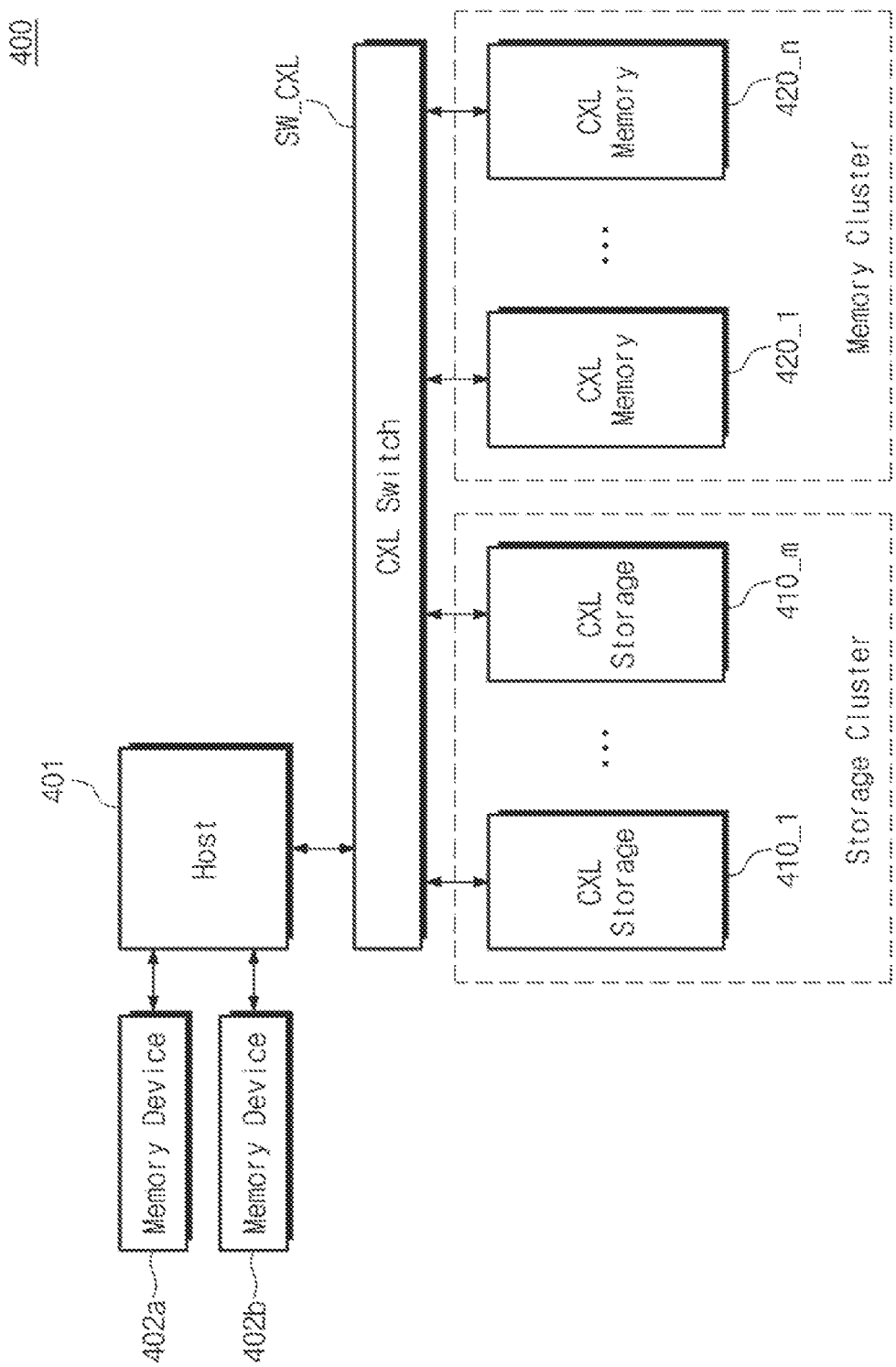
FIG. 17 is a block diagram illustrating a computing system according to some embodiments.

FIG. 17 is a block diagram illustrating a computing system according to some embodiments. Below, for convenience of description, additional description associated with the components described above will be omitted to avoid redundancy. Referring to FIG. 17, a computing system 400 may include a host 401, a plurality of memory devices 402a and 402b, the CXL switch SW_CXL, a plurality of CXL storages 410_1 to 410_m, and a plurality of CXL memories 420_1 to 420_n.

The host 401 may be directly connected with the plurality of memory devices 402a and 402b. The host 401, the plurality of CXL storages 410_1 to 410_m, and the plurality of CXL memories 420_1 to 420_n may be connected with the CXL switch SW_CXL and may communicate with each other through the CXL switch SW_CXL.

In an embodiment, the host 401 may manage the plurality of CXL storages 410_1 to 410_m as one storage cluster, and may mange the plurality of CXL memories 420_1 to 420_n as one memory cluster. The host 401 may allocate a partial area of the memory cluster for a dedicated area (i.e., an area for storing map data of the storage cluster) of the storage cluster. In some embodiments, the host 201 may allocate areas of the CXL memories 420_1 to 420_n for dedicated areas of the respective CXL storages 410_1 to 410_m.

Figure 18:
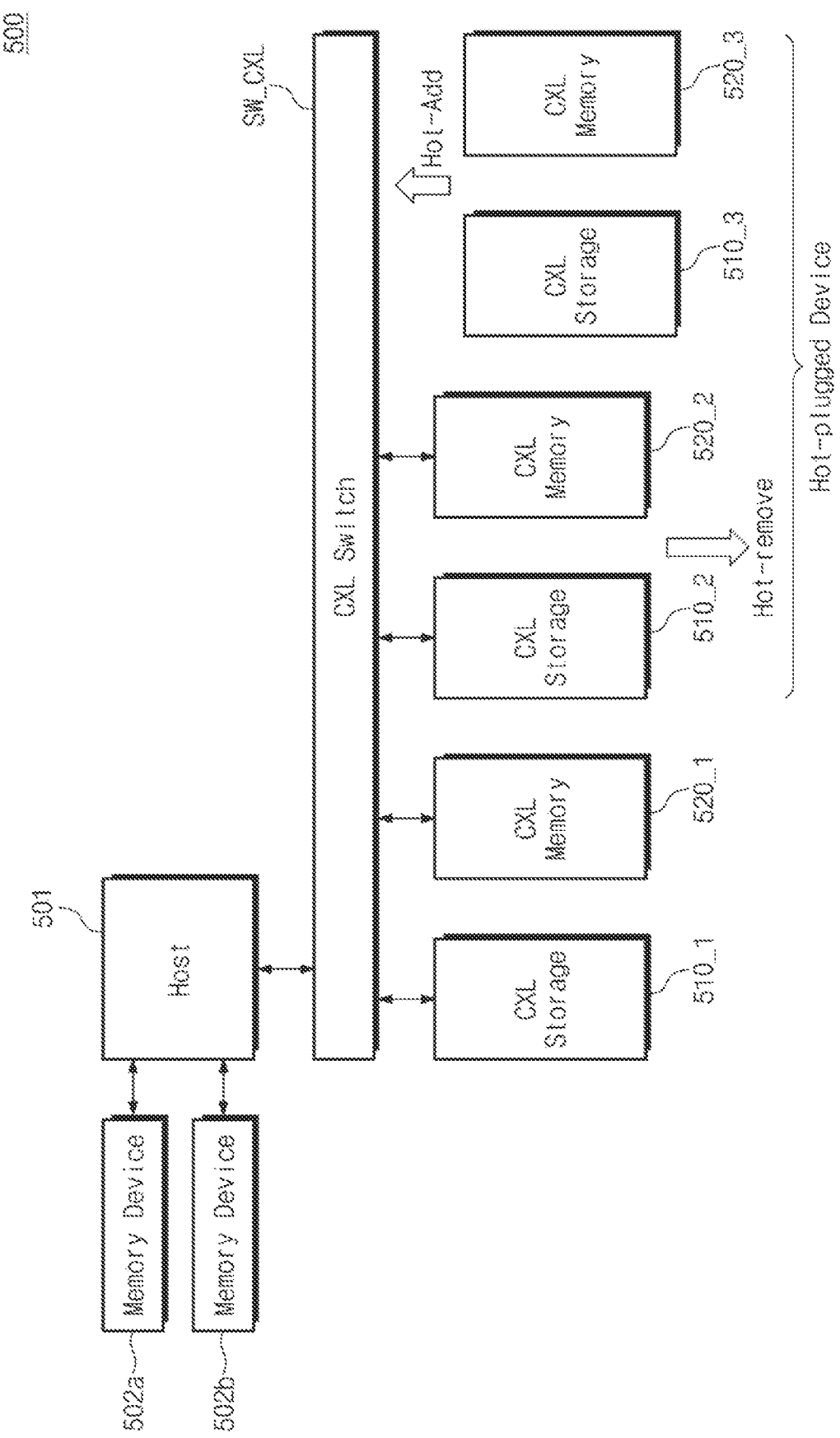
FIG. 18 is a block diagram illustrating a computing system according to some embodiments.

FIG. 18 is a block diagram illustrating a computing system according to some embodiments. Below, for convenience of description, additional description associated with the components described above will be omitted to avoid redundancy. Referring to FIG. 18, a computing system 500 may include a host 501, a plurality of memory devices 502a and 502b, the CXL switch SW_CXL, a plurality of CXL storages 510_1, 510_2, and 510_3, and a plurality of CXL memories 520_1, 520_2, and 520_3.

The host 501 may be directly connected with the plurality of memory devices 502a and 502b. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an embodiment, while the computing system 500 is being driven, some of the CXL storages 510_1 and 510_2 or some of the CXL memories 520_1 and 520_2 may be hot-removed from the CXL switch SW_CXL. In some embodiments, while the computing system 500 is being driven, the CXL storage 510_3 or the CXL memory 520_3 may be hot-added to the CXL switch SW_CXL. In this case, the host 501 may again perform memory allocation by again performing the initialization operation on devices connected with the CXL switch SW_CXL through the reset operation or the hot-plug operation. That is, CXL storage and a CXL memory according to some embodiments may support the hot-plug function and may make it possible to expand a storage capacity and a memory capacity of a computing system through various connections.

Figure 19:
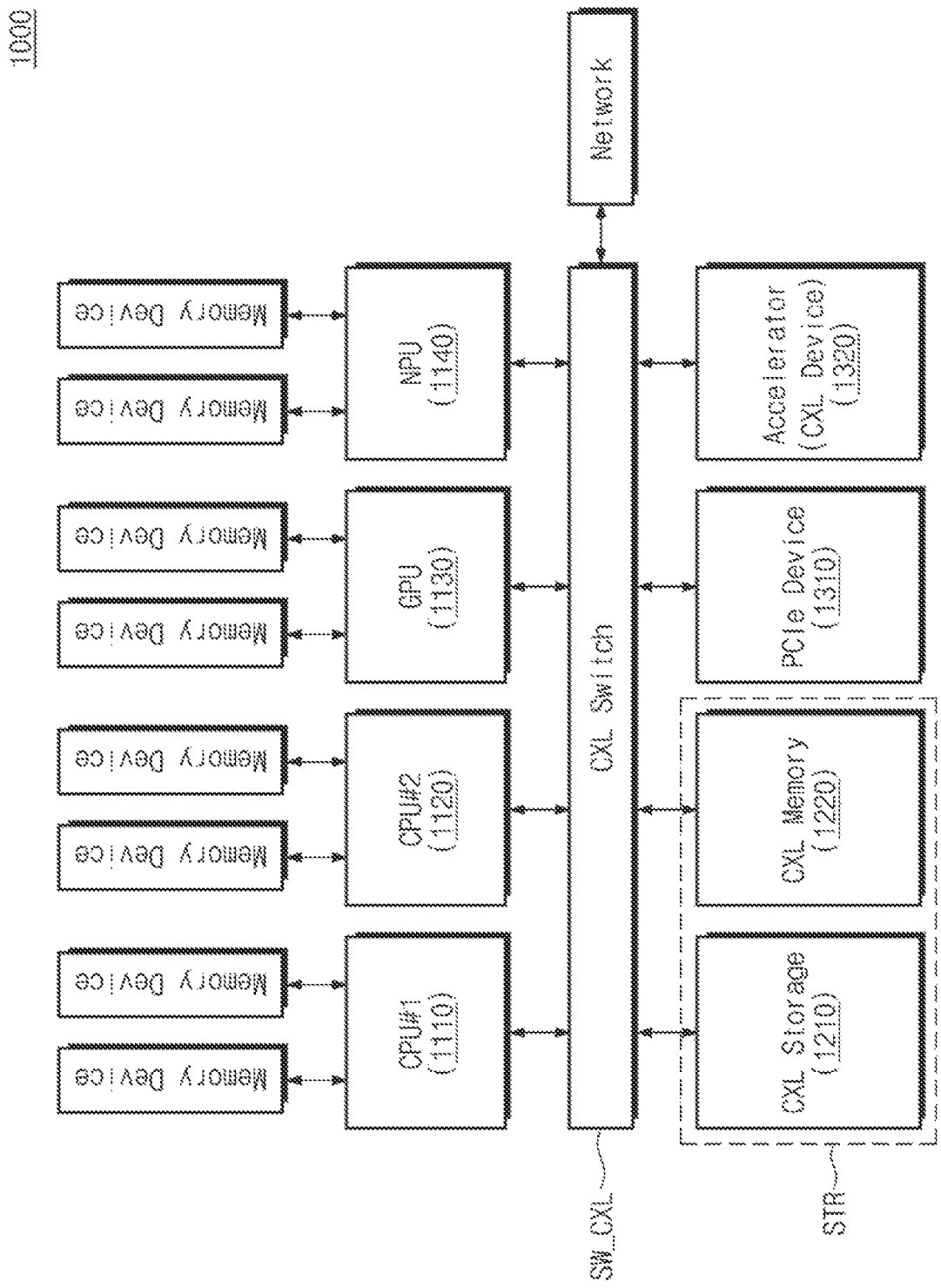
FIG. 19 is a block diagram illustrating a computing system according to some embodiments.

FIG. 19 is a block diagram illustrating a computing system according to some embodiments. For convenience of description, additional description associated with the components described above will be omitted to avoid redundancy. Referring to FIG. 19, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an embodiment, each of the first CPU 1110, the second CPU 1120, the GPU 1130, and the NPU 1140 may be the host described with reference to FIGS. 1 to 18 and may be directly connected with individual memory devices.

In an embodiment, the CXL storage 1210 and the CXL memory 1220 may be the CXL storage and the CXL memory described with reference to FIGS. 2 to 18, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an embodiment, the CXL switch SW_CXL may be connected with an external network or Fabric and may be configured to communicate with an external server through the external network or Fabric.

Figure 20:
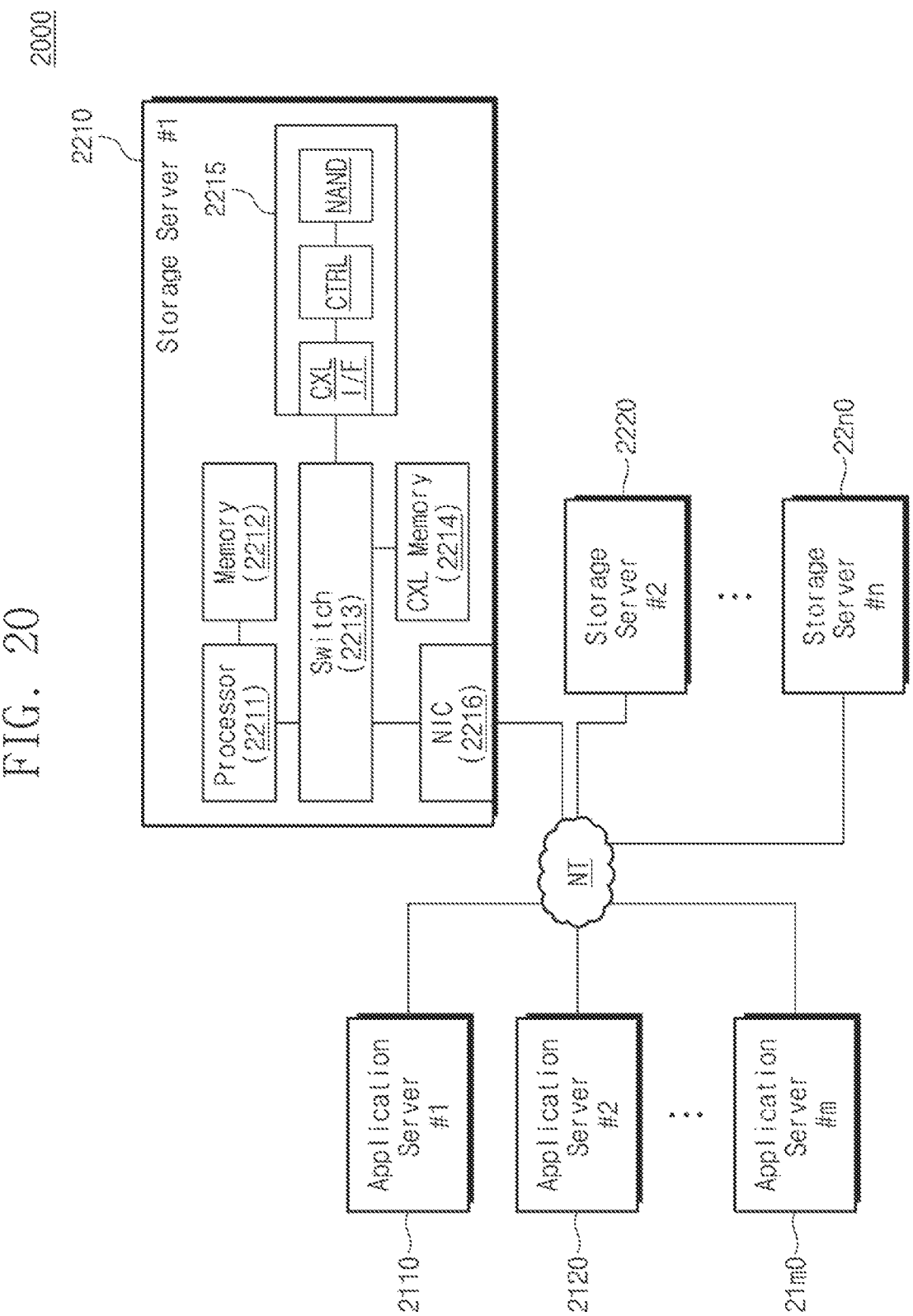
FIG. 20 is a block diagram illustrating a data center to which a computing system according to some embodiments is applied.

FIG. 20 is a block diagram illustrating a data center to which a computing system according to some embodiments is applied. Referring to FIG. 20, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to 21*m*0 and storage servers 2210 to 22*n*0. The number of application servers and the number of storage servers may be variously selected depending on an embodiment, and the number of application servers and the number of storage servers may be different from each other.

Below, a configuration of the first storage server 2210 will be mainly described. The application servers 2110 to 21*m*0 may have similar structures, the storage servers 2210 to 22*n*0 may have similar structures, and the application servers 2110 to 21*m*0 and the storage servers 2210 to 22*n*0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a DDR SDRAM (Double Data Rate Synchronous DRAM), an HBM (High Bandwidth Memory), an HMC (Hybrid Memory Cube), a DIMM (Dual In-line Memory Module), an Optane DIMM, and/or an NVDIMM (nonvolatile DIMM). The processor 2211 and the memory 2212 may be directly connected, and the numbers of processors 2211 and memories 2212 included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to 21*m*0.

The switch 2213 may be configured to arbitrate or route the communications between various components included in the first storage server 2210. In an embodiment, the switch 2213 may be implemented with the CXL switch SW_CXL described with reference to FIGS. 1 to 19. That is, the switch 2213 may be a switch implemented based on the CXL protocol.

The CXL memory 2214 may be connected with the switch 2213. In an embodiment, the CXL memory 2214 may be used as a memory expander for the processor 2211. In some embodiments, as described with reference to FIGS. 1 to 19, the CXL memory 2214 may be allocated for a dedicated memory or a buffer memory of the storage device 2215.

The storage device 2215 may include a CXL interface circuit CXL_IF, a controller CTRL, and a NAND flash NAND. Depending on a request of the processor 2211, the storage device 2215 may store data or may output the stored data. In an embodiment, the storage device 2215 may be implemented with the CXL storage described with reference to FIGS. 1 to 19. In an embodiment, as in the description given with reference to FIGS. 1 to 19, at least a partial area of the CXL memory 2214 may be allocated for a dedicated area, and the dedicated area may be used as a buffer memory (i.e., may be used to store map data in the CXL memory 2214).

According to an embodiment, the application servers 2110 to 21*m*0 may not include the storage device 2215. The storage server 2210 may include at least one or more storage devices 2215. The number of storage devices 2215 included in the storage server 2210 may be variously selected depending on an embodiment.

The NIC 2216 may be connected with the CXL switch SW_CXL. The NIC 2216 may communicate with the remaining storage servers 2220 to 22*n*0 or the application servers 2110 to 21*m*0 over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage depending on an access manner of the network NT.

In an embodiment, the network NT may be a storage-dedicated network such as a storage area network (SAN). For example, the SAN may be a FC-SAN that uses a FC network and is implemented depending on a FC protocol (FCP). For another example, the SAN may be an IP-SAN that uses a TCP/IP network and is implemented depending on an iSCSI (SCSI over TCP/IP or Internet SCSI). In an embodiment, the network NT may be a legacy network such as a TCP/IP network. For example, the network NT may be implemented depending on the following protocol: FCoE (FC over Ethernet), NAS (Network Attached Storage), or NVMe-oF (NVMe over Fabrics).

In an embodiment, at least one of the application servers 2110 to 21m0 may store data, which are store-requested by a user or a client, in one of the storage servers 2210 to 22n0 over the network NT. At least one of the application servers 2110 to 21m0 may obtain data, which are read-requested by the user or the client, from one of the storage servers 2210 to 22n0 over the network NT. For example, at least one of the application servers 2110 to 21m0 may be implemented with a web server, a database management system (DBMS), etc.

In an embodiment, at least one of the application servers 2210 to 21m0 may access a memory, a CXL memory, or a storage device included in any other application server over the network NT or may access memories, CXL memories, or storage devices included in the storage servers 2210 to 22n0 over the network NT. As such, at least one of the application servers 2110 to 21m0 may perform various operations on data stored in the remaining application servers and/or storage servers. For example, at least one of the application servers 2110 to 21m0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an embodiment, a CXL memory included in at least one of the application servers 2110 to 21m0 and the storage servers 2210 to 22n0 may be allocated for a dedicated area of a storage device included in at least one of the application servers 2110 to 21m0 and the storage servers 2210 to 22n0, and the storage device may use the dedicated area thus allocated as a buffer memory (i.e., may store map data in the dedicated area). For example, a CXL memory included in a storage server (e.g., 22n0) may be allocated to the storage device 2215 included in the storage server 2210, and the storage device 2215 included in the storage server 2210 may access the CXL memory included in the storage server (e.g., 22n0) over the switch 2213 and the NIC 2216. In this case, the map data associated with the storage device 2215 of the first storage server 2210 may be stored in the CXL memory of the storage server 22n0. That is, storage devices and CXL memories of a data center according to the present disclosure may be connected and implemented in various manners.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, map data may be stored in a memory device separated from a storage device. Accordingly, a large amount of map data may be used without costs for separate research and development. According to the present disclosure, partial map data are stored in an internal buffer memory of the storage device. Accordingly, the accessibility of the storage device to frequently used partial map data is improved.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A computing device comprising:
a processor;
a plurality of memory devices configured to directly communicate with the processor;
a bus configured to communicate with the processor;
a storage device including a nonvolatile memory, an internal buffer memory, and a storage controller configured to control the nonvolatile memory and the internal buffer memory and to communicate with the bus; and
a memory including a buffer memory and a memory controller configured to control the buffer memory and to communicate with the bus,
wherein the nonvolatile memory of the storage device stores user data and map data,
wherein, in an initialization operation, the storage controller sends the map data to the memory through the bus based on a peer-to-peer manner without control of the processor,
wherein, in the initialization operation, the memory controller stores the map data that is transferred from the storage device through the bus, in the buffer memory,
wherein, after the initialization operation, the memory controller sends partial map data of the map data to the storage device through the bus based on the peer-to-peer manner without control of the processor, and
wherein the storage controller stores the partial map data that is transferred from the memory through the bus, in the internal buffer memory.

2. The computing device of claim 1, wherein, after the initialization operation, the storage controller sends a read request to the memory through the bus, and
wherein the memory controller sends the partial map data to the bus based on the read request.

3. The computing device of claim 1, wherein the map data includes a plurality of address pairs in which logical block addresses are mapped to physical block addresses, and
wherein, when a corresponding address pair corresponding to a logical block address that is received from the processor connected to the bus and is included in a read request is present in the internal buffer memory as a portion of the partial map data, the storage controller reads the corresponding address pair from the internal buffer memory and processes the read request based on the corresponding address pair.

4. The computing device of claim 1, wherein the map data includes a plurality of address pairs in which logical block addresses are mapped to physical block addresses, and
wherein, when a corresponding address pair corresponding to a logical block address that is received from the processor connected to the bus and is included in a read request is absent from the internal buffer memory as a portion of the partial map data, the storage controller requests the corresponding address pair from the memory and processes the read request based on the corresponding address pair transferred from the memory through the bus.

5. The computing device of claim 4, wherein the storage controller writes the corresponding address pair in the internal buffer memory as a portion of the partial map data.

6. The computing device of claim 4, wherein, when a capacity in the internal buffer memory is insufficient to store the corresponding address pair, the storage controller selects one of address pairs of the partial map data as a victim, removes the victim from the internal buffer memory, and writes the corresponding address pair in the internal buffer memory.

7. The computing device of claim 6, wherein the storage controller manages read counts of address pairs of the partial map data stored in the internal buffer memory and selects, as the victim, an address pair having a smallest read count from among the address pairs of the partial map data.

8. The computing device of claim 1, wherein the map data includes a plurality of address pairs in which logical block addresses are mapped to physical block addresses, and
wherein the storage controller generates a corresponding address pair corresponding to a logical block address that is received from the processor connected to the bus and is included in a write request, processes the write request based on the corresponding address pair, and writes the corresponding address pair in the internal buffer memory as a portion of the partial map data.

9. The computing device of claim 8, wherein the storage controller sends the corresponding address pair to the memory through the bus, and
wherein the memory controller writes the corresponding address pair that is transferred from the storage device through the bus, in the buffer memory as a portion of the map data.

10. The computing device of claim 1, wherein, after sending the partial map data to the storage device through the bus, the memory controller removes a portion of the map data that corresponds to the partial map data from the map data present in the buffer memory.

11. The computing device of claim 10, wherein the map data includes a plurality of address pairs in which logical block addresses are mapped to physical block addresses, and
wherein the storage controller manages read counts of the plurality of address pairs, and stores address pairs that have relatively large read counts from among the plurality of address pairs of the map data, in the internal buffer memory as the partial map data.

12. The computing device of claim 11, wherein the storage controller periodically performs tiering such that address pairs stored in the internal buffer memory as the partial map data from among the plurality of address pairs of the map data, and address pairs stored in the buffer memory are rearranged.

13. The computing device of claim 12, wherein the storage controller periodically performs the tiering based on one of a time period, and a frequency at which the address pairs stored in the internal buffer memory are read.

14. The computing device of claim 12, wherein the tiering includes exchanging a portion of the address pairs of the partial map data that are stored in the internal buffer memory with a portion of the address pairs that are stored in the buffer memory.

15. The computing device of claim 12, wherein the tiering includes moving the partial map data to the buffer memory such that the map data are restored, and storing, as the partial map data, address pairs having relatively larger read counts from among a plurality of address pairs of the restored map data in the internal buffer memory.

16. The computing device of claim 10, wherein the map data includes a plurality of address pairs in which logical block addresses are mapped to physical block addresses, and
wherein the storage controller selects, as the partial map data, address pairs that correspond to logical block addresses of a specific range from among a plurality of address pairs of the map data.

17. The computing device of claim 1, wherein the memory controller divides the buffer memory into a first area and a second area, stores the map data in the first area, and permits the processor that is connected with the bus to access the second area.

18. A storage device comprising:
a nonvolatile memory;
an internal buffer memory; and
a storage controller configured to control the nonvolatile memory and the internal buffer memory, to communicate with an external bus, and to communicate with an external processor through the external bus, the external processor being configured to directly communicate with a plurality of memory devices,
wherein the nonvolatile memory includes user data and map data,
wherein the map data includes a plurality of address pairs in which logical block addresses are mapped to physical block addresses,
wherein, in an initialization operation, the storage controller outputs the map data to an external memory through the external bus based on a peer-to-peer manner without control of the external processor through the external bus, and
wherein, after the initialization operation, the storage controller receives partial map data of the map data from the external memory through the external bus based on the peer-to-peer manner without control of the external processor through the external bus, and stores the partial map data in the internal buffer memory.

19. The storage device of claim 18, wherein the storage controller uses the internal buffer memory as a cache memory of the map data and selects a victim based on read counts of address pairs of the partial map data in the internal buffer memory.

20. An operating method of a computing device which includes a processor, a storage device, a memory, and a plurality of memory devices configured to directly communicate with the processor, the method comprising:
sending, at the storage device, map data stored in a nonvolatile memory of the storage device to the memory through a bus based on a peer-to-peer manner without control of the processor;
reading, at the storage device, partial map data of the map data from the memory through the bus based on the peer-to-peer manner without control of the processor and storing the partial map data in an internal buffer memory of the storage device; and executing, at the storage device, a command that is transferred through the bus from the processor connected with the bus, based on one of the map data present in the memory and the partial map data present in the internal buffer memory.

\* \* \* \* \*